US012529756B2

(12) United States Patent
Harkins et al.

(10) Patent No.: US 12,529,756 B2
(45) Date of Patent: Jan. 20, 2026

(54) COMPOSABLE RADAR

(71) Applicant: Raytheon Company, Waltham, MA (US)

(72) Inventors: Brian J. Harkins, Westford, MA (US); Craig H. McCordic, Medfield, MA (US); John A. Mikutel, Derry, NH (US); Mark J. Beaulieu, Sutton, MA (US)

(73) Assignee: Raytheon Company, Arlington, VA (US)

( * ) Notice: Subject to any disclaimer, the term of this patent is extended or adjusted under 35 U.S.C. 154(b) by 734 days.

(21) Appl. No.: 17/357,134

(22) Filed: Jun. 24, 2021

(65) Prior Publication Data

US 2022/0413090 A1   Dec. 29, 2022

(51) Int. Cl.
G01S 7/02         (2006.01)
G01S 7/40         (2006.01)
(Continued)

(52) U.S. Cl.
CPC ................ *G01S 7/027* (2021.05); *G01S 7/40* (2013.01); *G01S 13/87* (2013.01); *G01S 7/003* (2013.01);
(Continued)

(58) Field of Classification Search
CPC . G01S 7/027; G01S 7/40; G01S 13/87; G01S 2013/0245; G01S 7/02;
(Continued)

(56) References Cited

U.S. PATENT DOCUMENTS 6,222,502 B1    4/2001  Falbo et al.
6,236,862 B1    5/2001  Erten et al.
(Continued)

FOREIGN PATENT DOCUMENTS

CA    2 873 172       9/2015
CA     2873172 A1     9/2015
(Continued)

OTHER PUBLICATIONS

Taiwan Allowance Decision (with English Translation) dated Nov. 28, 2023 for Taiwan Application No. 111117484; 3 Pages.
(Continued)

*Primary Examiner* — William Kelleher
*Assistant Examiner* — Ismaaeel A. Siddiquee

(57) ABSTRACT

A modular radar system comprises an antenna assembly, a support structure to which the antenna assembly is mounted, and a set of modular radar subsystems. The antenna assembly comprises an antenna array, an antenna enclosure to which the antenna array is attached and which is configured to house the antenna array and to distribute communications signals and power signals to the antenna array, and an antenna enclosure interface configured to receive inputs to and provide outputs from, the antenna array. The support structure positions the antenna array at an orientation and elevation for antenna operation. The set of modular radar subsystems is separate from the support structure and in operable communication with the antenna enclosure interface and comprises a data processing subsystem, a cooling subsystem, and an AC power subsystem supplying power to the antenna enclosure, the data processing subsystem, the cooling subsystem and to a DC power conversion subsystem.

21 Claims, 19 Drawing Sheets

(51) Int. Cl.
*G01S 13/02* (2006.01)
*G01S 13/87* (2006.01)
*G01S 7/00* (2006.01)
*H01Q 1/02* (2006.01)
*H01Q 1/12* (2006.01)
*H01Q 3/26* (2006.01)
*H01Q 21/00* (2006.01)
*H01Q 21/20* (2006.01)

(52) U.S. Cl.
CPC .......... *G01S 7/02* (2013.01); *G01S 2013/0245* (2013.01); *H01Q 1/02* (2013.01); *H01Q 1/1242* (2013.01); *H01Q 3/26* (2013.01); *H01Q 3/267* (2013.01); *H01Q 21/0025* (2013.01); *H01Q 21/205* (2013.01)

(58) Field of Classification Search
CPC .......... G01S 7/003; H01Q 3/267; H01Q 1/02; H01Q 1/1242; H01Q 3/26; H01Q 21/0025; H01Q 21/205
See application file for complete search history.

(56) References Cited

U.S. PATENT DOCUMENTS

| | | | |
|---|---|---|---|
| 6,292,134 | B1 | 9/2001 | Bondyopadhyay |
| 6,292,364 | B1 | 9/2001 | Fitzgerald et al. |
| 6,657,577 | B1 | 12/2003 | Gregerson et al. |
| 7,603,894 | B2 | 10/2009 | Breed |
| 8,169,311 | B1 | 5/2012 | Breed |
| 8,178,457 | B2 | 5/2012 | De Rochemont |
| 8,803,759 | B1 | 8/2014 | Angelucci |
| 8,810,448 | B1* | 8/2014 | Ellsworth ............ G01S 7/02 361/699 |
| 8,836,607 | B2 | 9/2014 | Cook |
| 9,116,222 | B1 | 8/2015 | Ellsworth et al. |
| 9,620,866 | B2 | 4/2017 | Chang et al. |
| 9,698,465 | B1 | 7/2017 | Kullman et al. |
| 10,651,567 | B2 | 5/2020 | Kamo et al. |
| 10,684,365 | B2 | 6/2020 | Bunch et al. |
| 10,886,595 | B1 | 1/2021 | Ortel et al. |
| 2007/0057781 | A1 | 3/2007 | Breed |
| 2008/0204350 | A1* | 8/2008 | Tam ............ H01Q 21/065 343/872 |
| 2008/0316101 | A1 | 12/2008 | Brown et al. |
| 2010/0039770 | A1 | 2/2010 | Danello et al. |
| 2010/0099370 | A1* | 4/2010 | Nichols ............ H01Q 21/20 343/893 |
| 2014/0368373 | A1 | 12/2014 | Crain et al. |
| 2014/0368378 | A1 | 12/2014 | Crain et al. |
| 2019/0033440 | A1* | 1/2019 | Boolos ............ G01S 13/42 |
| 2019/0118960 | A1* | 4/2019 | Izquierdo Gil ............ H02J 1/14 |
| 2019/0341669 | A1* | 11/2019 | Schmonsees ........ H01Q 1/1207 |
| 2020/0052390 | A1* | 2/2020 | Ahmadloo ............ H01Q 21/065 |
| 2020/0200868 | A1 | 6/2020 | Meier et al. |
| 2021/0083399 | A1 | 3/2021 | Mccordic et al. |
| 2021/0141078 | A1* | 5/2021 | Ahmadloo ............ G01S 13/42 |
| 2021/0263096 | A1* | 8/2021 | Herbrig ............ H04B 17/21 |
| 2021/0399695 | A1* | 12/2021 | Kultran ............ H03F 3/21 |
| 2022/0177109 | A1* | 6/2022 | Hefner ............ B64C 1/36 |

FOREIGN PATENT DOCUMENTS

| | | |
|---|---|---|
| CA | 2 954 985 | 4/2016 |
| CA | 2954985 A1 | 4/2016 |
| CN | 109075454 A | 12/2018 |
| CN | 213304329 U | 5/2021 |
| DE | 112018001974 T5 | 1/2020 |
| DE | 112018002020 T5 | 1/2020 |
| EA | 200000091 A1 | 6/2000 |
| EP | 2974085 A2 | 1/2016 |
| EP | 3082920 A1 | 10/2016 |
| EP | 3602144 A1 | 2/2020 |
| JP | 2000-027302 A | 1/2000 |
| JP | 3242377 B2 | 12/2001 |
| JP | 2004-028980 A | 1/2004 |
| TW | I 666823 B | 7/2019 |
| WO | WO 2011117619 A2 | 9/2011 |
| WO | WO 2012154262 A2 | 11/2012 |
| WO | WO 2014168499 A1 | 10/2014 |
| WO | WO 2014171993 A2 | 10/2014 |
| WO | WO 2014145162 A3 | 12/2014 |
| WO | WO 2015089582 | 6/2015 |
| WO | WO 2016179650 A1 | 11/2016 |
| WO | WO 2017096420 A1 | 6/2017 |
| WO | WO 2017111768 A1 | 6/2017 |
| WO | WO 2017111865 A1 | 6/2017 |
| WO | WO 2017132539 A1 | 8/2017 |
| WO | WO 2020009834 A1 | 1/2020 |
| WO | WO 2021055175 A1 | 3/2021 |

OTHER PUBLICATIONS

Response (with English Translation) to Taiwan Office Action dated May 31, 2023 for Taiwan Application No. 111117484; Response filed Jun. 29, 2023; 25 Pages.
Dickenson, "Air & Missile Defense Radar (AMDR) AN-SPY-6(V)," Raytheon, May 21, 2015; 22 Pages.
Ferris, et al., "On the Design of a NASA-MSC Antenna Facility," The University of Michigan College of Engineering Department of Electrical Engineering Radiation Laboratory, Aug. 1963, 159 Pages.
Lockhead Martin, "Advanced Persistent Surveillance," Jun. 2020, 1 Page.
Lucero, et al., "DoD's Perspective on Radar Open Architectures," The Mitre Corporation, Jun. 2010, 7 Pages.
U.S. Appl. No. 17/660,386, filed Apr. 22, 2022, McCordic et al.
Dickenson, "Air & Missile Defense Radar (AMDR) AN-SPY-6(V);" Raytheon Company PowerPoint Presentation, Distribution A: Public Release; May 21, 2015; 22 Pages.
Ferris et al., "On the Design of a NASA-MSC Antenna Facility;" Paper from the College of Engineering at The University of Michigan; Aug. 1963; 159 Pages.
Lockheed Martin, "Advanced Persistent Surveillance;" Retrieved from https://www.lockheedmartin.com/en-us/products/aegis-combat-system.html; Jun. 2020; 1 Page.
PCT International Search Report and Written Opinion dated May 30, 2023 for International Application No. PCT/US2023/062342; 10 Pages.
Taiwan Office Action (with English Translation) dated May 31, 2023 for Taiwan Application No. 111117484; 15 Pages.
Bertilsson et al., "A Scalable Architecture for Massive MIMO Base Stations Using Distributed Processing;" Proceedings of the 2016 50th Asilomar Conference on Signals, Systems and Computers; Nov. 6, 2016; 5 Pages.
Hoogeboom et al., "TCAR, the Transatlantic Cooperative AGS Radar: A Programmatic and Technical Overview;" Proceedings of the First European Radar Conference; Feb. 2004; 4 Pages.
PCT International Search Report and Written Opinion dated Jul. 28, 2022 for International Application No. PCT/US2022/027224; 15 Pages.
Notice of Reasons for Refusal dated Aug. 20, 2024 in connection with Japanese Patent Application No. 2023-578071, 9 pages.
Communication pursuant to Article 94(3) EPC dated Dec. 18, 2024 in connection with European Patent Application No. 22724576.8, 6 pages.

* cited by examiner

| Data Processing Shelter 212b ||
|---|---|
| Digital Beamformer Sub-System (DBFS) 2002 | Antenna Interface Unit Sub-System (AIU) 2012 |
| Digital Signal Processing Sub-System (DSPS) 2004 | Digital Signal Processing Sub-System (DSPS) 2014 |
| Real Time Simulation Sub-System (RTSS) 2006 | Radar Control Processing Sub-System (RCP) 2016 |
| Data Recording Sub-System (DRSS) 2008 | Risk Management Framework (RMF) 2018 |
| Other (if required) 2010 | C5I Interface 2020 |

COMPOSABLE RADAR

FIELD

Embodiments of the disclosure generally relate to devices, systems, and methods for operating a device such as a radar system. More particularly, the disclosure describes embodiments relating to devices, systems, and methods for creating a radar system having a modular, scalable, and composable architecture.

BACKGROUND

Radar systems are systems that use uses radio waves to determine the distance (range), angle, or velocity of objects and typically include a transmitter producing electromagnetic waves in the radio or microwaves domain, a transmitting antenna, a receiving antenna (often the same antenna is used for transmitting and receiving) and a receiver and processor to determine properties of the object(s). Radio waves (pulsed or continuous) from the transmitter reflect off the object and return to the receiver, giving information about the object's location and speed. In many systems, the antenna is an antenna array, which is a group of multiple connected antennas coupled to a common source or load to act as a single antenna and produce a directive radiation pattern. Common antenna arrays for radar systems can include ESA (electronically scanned array) and AESA (active electronically scanned array) antennas, as is known in the art. Typically, the basic building block of a conventional AESA is the Transmit/Receive module or TR module, which can be packaged to form an AESA antenna element, and may include a radiator, receiver Low Noise Amplifier (LNA), transmit Power Amplifier (PA), and digitally controlled phase or delay and gain components. Several of these TR modules are placed on antenna panels in a grid format for transmitting and receiving radar signals. Digital control of the transmit/receive gain and phase allows an AESA antenna to steer or point the resultant antenna beam without physically moving the antenna panel. Typical modern day low cost AESA antenna panels employ printed circuit radiators connected to surface mount Monolithic Microwave Integrated Circuit (MMIC) devices that contain the LNA, PA and phase/gain control circuitry, all on a single printed circuit board (PCB).

In recent years, AESA antenna array architectures have been developed using modular and/or stackable components. FIG. 1 is an illustration of an antenna array 100 architecture constructed using modular, stackable components, as described in several commonly assigned patents and patent applications, including U.S. Pat. No. 8,810,448, entitled "Modular Architecture for Scalable Phased Array Radars," which issued on Aug. 19, 2014; U.S. Pat. No. 9,116,222, entitled, "Modular Architecture for Scalable Phased Array Radars," (which is a divisional of U.S. Pat. No. 8,810,448), which issued on Aug. 25, 2015; and U.S. Patent Publication No. 20210083399, entitled "Modular and Stackable Antenna Array," having application Ser. No. 16/573,954, filed on Sep. 17, 2019 and published on Mar. 18, 2021 (hereinafter "'954 application"). The disclosures of each of these documents are hereby incorporated by reference.

As shown in FIG. 1 and as further described in the above-listed patent documents, a plurality of power and beamforming building blocks 102 can be arranged in an array 116 in rows and columns. Each Modular Building Block (MBB) 102 (also referred to herein as a Radar Modular Assembly (RMA) and/or a functional building block (FBB)) may include a number of transmit/receive integrated multichannel module (TRIMM) cards 110 and their associated power and signals electronics cards including, for example 24 TRIMMs, a synthesizer card, a DREX (Digital Receiver Exciter) card 106, a synthesizer 108, and an auxiliary power controller card 104. In this example architecture, each individual TRIMM card 110 may be replaceable as well as the architecture may be modular at the modular building block. A plurality of MBBs 102 can be combined to form a Modular Radar Assembly (MRA), and multiple MRAs can be combined together to form a single radar antenna array 114. As described further in the aforementioned '954 application, in the example of FIG. 1, groups of the MBB 102 can be coupled together, with its own supporting structure 122, to form a building block section 112 of a modular radar assembly (MRA) 114, wherein each section 112 is configured to have its own respective connections for power, cooling, control signals, and beamforming that are coupled in parallel, such that each section 112 can function independently of each other section. In the antenna array 100 of FIG. 1, this enables the sections 112 to be combined (e.g., by stacking or by being placed adjacent to each other) together to produce any size antenna array desired, including forming an array face 120 by aligning the faces of each respective MRA sub section 112, to create a single uniform array face.

SUMMARY

The following presents a simplified summary in order to provide a basic understanding of one or more aspects of the embodiments described herein. This summary is not an extensive overview of all of the possible embodiments and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

Design, test, and manufacture of radar systems such as that shown in FIG. 1 can involve significant time, expense, and engineering expertise. Consequently, changes to any part of a radar system's design and/or operation similarly can result in costly and time consuming changes to multiple parts of the radar system. As is known in the art, in many instances, radar systems are often specifically designed or tailored for certain applications and locations, so if new requirements, applications, or other demands necessitate changes to the radar system, it can be difficult to make changes, upgrades, expansions, and/or improvements, especially to the hardware of fielded radar systems. For example, changing an antenna to a larger size of array with increased power requirements, can require significant upgrading throughout the rest of the system, including new or upgraded power distribution systems, new or upgraded cooling systems, additional data processing capability, etc.

In addition to the cost, time, and expense of radar system changes, customers who purchase radar systems (especially large installations such as military radar systems) often may prefer mature technologies be used for upgrades and/or incremental insertion into existing systems, versus completely new designs. Enabling mature technologies to be retrofitted or adapted to work with fielded systems, however, can require costly and time consuming significant re-engineering of some or all of the radar system, especially of radar subsystems, to be able to make this work.

At least some embodiments herein attempt to resolve at least some of these concerns.

In certain embodiments, a new, tower-based family of radar systems is provided that features modular building block sub-systems designed to allow customers to configure and rapidly deploy systems tailored to mission needs. Using pre-defined and tested building blocks, at least some embodiments establish a family of high performance radars composed of high technology readiness level (TRL) sub-systems and provide a novel, systematic radar architecture that addresses a diverse mission space with mature technology. Each high TRL building block and radar sub-system, in certain embodiments, is tailored to requirements and/or budgets without requiring substantial added engineering. In certain embodiments, building blocks are defined for each sub-system, enabling radar systems to scale from relatively small apertures to large apertures intended for highly specialized missions. In certain embodiments, sub-system maturity provides confidence that the radar hardware will perform as expected, without expensive test cycles, which can help enable system level performance and requirements to be confirmed through simulation.

In certain embodiments, the unique, tower-based radar system configurations described herein leverage a new, fully integrated antenna support structure. This structure facilitates integration of three independent antenna enclosures (also referred to herein as array enclosures) onto a tower structure, as described further herein in connection with at least some embodiments. These enclosures, which are a new design, are purposefully configured to facilitate rapid deployment, to provision for system growth, and to enable radar system configurability without new design cycles. In at least some embodiments, each sub-system is new but defined by and adapted from mature building block architectures. In certain embodiments, each sub-system is shelterized, scalable, and relocatable which enables integration and checkout in factory environments. For example, in at least some embodiments, each modular subsystem is independently functionally scalable, meaning that the subsystem's functional capability (including but not limited to functions such as cooling capacity, signal processing capacity, power capacity etc.) can be independently modified, increased, decreased, etc., based on functional and/or operational needs of other components in the system. In at least some embodiments, by leveraging mature antenna components and technologies, and the fact that building blocks are common across the family of radars and other programs of record, customers and users not only benefit from cost avoidance associated with engineering advancements or new development, but also realize full DOTMLPF (Doctrine, Organization, Training, Materiel, Leadership, Personnel, and Facilities) efficiencies.

In one embodiment, a modular radar system comprises a first antenna assembly, a support structure to which the first antenna assembly is mounted, and a first set of modular radar subsystems. The first antenna assembly comprises a first antenna array, a first antenna enclosure to which the first antenna array is attached, the first antenna enclosure configured to house the first antenna array and to distribute first communications signals and first power signals to the first antenna array, and a first antenna enclosure interface configured to receive first inputs to the first antenna array and provide first outputs from the first antenna array. The support structure is configured to position the antenna array of the first antenna enclosure at a first orientation and at an elevation sufficient for antenna operation. The first set of modular radar subsystems is configured to be separate from the support structure, the set of modular radar subsystems configured to be in operable communication with the at least one first antenna enclosure interface via a respective first set of connections. The first set of modular radar subsystems comprises a first data processing subsystem, a first cooling subsystem, and a first alternating current (AC) power subsystem. The first data processing subsystem is configured to provide inputs to the interface of the first antenna enclosure, to control beamforming for the first antenna array, and to perform signal processing on the outputs of the first antenna. The first cooling subsystem supplies cooling to the first antenna enclosure and the first data processing subsystem. The first AC power subsystem is configured for supplying power to the first antenna enclosure, the first data processing subsystem, the first cooling subsystem and to a first direct current (DC) power conversion subsystem.

In some embodiments, the first array has a first array size and wherein at least one respective subsystem in the first set of modular radar subsystems is configured to be functionally and independently scalable based on at least one of a first array size and on operational requirements of the first antenna array. In some embodiments, the support structure is configured to route the respective first set of connections between the first set of modular radar subsystems and the at least one first antenna enclosure interface. In some embodiments, the first antenna enclosure and the support structure are configured to be scalable to enable the first antenna array to be scaled to a second array size different than the first array size, without removal of the first antenna assembly from the support structure.

In some embodiments, the set of modular radar subsystems are configured to be housed in respective relocatable shelters that are separate from the support structure. In some embodiments, the first antenna enclosure and the support structure are configured to enable self-alignment of the first antenna assembly as part of installation of the first antenna enclosure to the support structure.

In some embodiments, the first set of connections further comprises a first portion operably coupled to the at least one first antenna interface and a second portion configured for connection to a respective one of the first set of modular radar subsystems, wherein the first set of respective connections and the first antenna enclosure are operably coupled together, including connection of each respective first portion to the at least one first antenna enclosure interface, before installing on the support structure and wherein the first antenna enclosure, first antenna array, and first set of connections, are all calibrated prior the first antenna assembly being mounted to the support structure.

In some embodiments, the support structure comprises an antenna enclosure mounting portion configured to enable attachment of at least a second antenna assembly thereon at a second orientation different from the first orientation, the second antenna assembly comprising a second antenna array; a second antenna enclosure to which the second antenna array is attached, the second antenna enclosure configured to house the second antenna array and to distribute second communications signals and second power signals to the second antenna array; and a second antenna enclosure interface configured to receive second inputs to the second antenna array and provide second outputs from the second antenna array. The second antenna assembly is in operable communication with a respective second set of modular radar subsystems via a respective second set of connections between the second set of modular radar subsystems and the at least one respective second antenna enclosure interface, wherein the second set of modular radar subsystems is configured to be separate from the support structure and separate from the first set of modular radar subsystems.

In some embodiments, the second set of modular radar subsystems comprises a second data processing subsystem configured to provide inputs to the interface of the second antenna enclosure, to control beamforming for the second antenna array, and to perform signal processing on the outputs of the second antenna array; a second cooling subsystem supplying cooling to the second antenna enclosure and the second data processing subsystem; and a second alternating current (AC) power subsystem configured for supplying power to the second antenna enclosure, the second data processing subsystem, the second cooling subsystem and to a second direct current (DC) power conversion shelter; wherein the second array has a second array size and wherein at least one respective subsystem in the second set of modular radar subsystems is configured to be functionally and independently scalable based on at least one of the second array size and operational requirements of the second antenna array.

In some embodiments, the first antenna enclosure is configured to be at least one of watertight, weathertight, electromagnetic interference (EMI) shielded, and high intensity electromagnetic pulses (HEMP) resistant. In some embodiments, the support structure comprises a tower structure configured to elevate the antenna assembly by a predetermined distance above the first set of modular radar subsystems.

In another aspect, a modular radar system is provided comprising an antenna assembly and a set of modular radar subsystems. The antenna assembly comprises an antenna array, an antenna enclosure to which the first antenna array is attached, the antenna enclosure configured to house the antenna array and to distribute first communications signals and first power signals to the antenna array, and an antenna enclosure interface configured to receive inputs to the antenna array and provide outputs from the antenna array. The set of modular radar subsystems is configured to be separate from the antenna assembly, the set of modular radar subsystems configured to be in operable communication with the at least one first antenna enclosure interface via a respective set of connections, wherein the set of modular radar subsystems comprises a data processing subsystem, a cooling subsystem, and an alternating current (AC) power subsystem. The data processing subsystem is configured to provide inputs to the interface of the antenna enclosure, to control beamforming for the antenna array, and to perform signal processing on the outputs of the antenna array. The cooling subsystem supplies cooling to the antenna enclosure and the data processing subsystem. The AC power subsystem is configured for supplying power to the antenna enclosure, the data processing subsystem, the cooling subsystem and to a direct current (DC) power conversion subsystem.

In some embodiments of the modular radar system, the array has an array size and wherein at least one respective subsystem in the set of modular radar subsystems is configured to be functionally and independently scalable based on at least one of the array size and operational requirements of the first antenna array. In some embodiments of the modular radar system, the set of connections further comprises a first portion operably coupled to the at least one antenna interface and a second portion configured for connection to a respective one of the set of modular radar subsystems, wherein the set of respective connections and the antenna enclosure are operably coupled together, including connection of each respective first portion to the at least one antenna enclosure interface, before installation at an operational location and wherein the antenna enclosure, antenna array, and set of connections, are all calibrated prior the antenna assembly being installed at the operational location, In some embodiments, the modular radar system further comprises a support structure to which the antenna assembly is mounted and through which the set of connections is routed, the support structure comprising a tower structure that is separate from the set of modular radar subsystems and which is configured to elevate the antenna assembly a predetermine distance above the set of modular radar subsystems. In some embodiments of the modular radar system, the antenna enclosure is configured to be at least one of watertight, weathertight, electromagnetic interference (EMI) shielded, and high intensity electromagnetic pulses (HEMP) resistant. In some embodiments, the tower structure comprises an antenna enclosure mounting portion configured to permit mounting of the antenna enclosure at any one of a plurality of orientations.

In another aspect, a method of providing a modular radar system is provided. An antenna array is attached to an antenna enclosure to form an antenna assembly, wherein the antenna enclosure is configured to house the antenna array and to distribute first communications signals and first power signals to the antenna array. An antenna enclosure interface is coupled to the antenna enclosure, the antenna enclosure interface configured to receive inputs to the antenna array and provide outputs from the antenna array. A set of connections is attached to the antenna enclosure interface to form an antenna assembly comprising the antenna enclosure, the antenna array, the antenna enclosure interface, and the set of connections, wherein the set of connections are configured to couple the antenna assembly to one or more modular radar subsystems. The antenna assembly is mounted to a support structure configured to position the antenna array at a first orientation and at an elevation sufficient for antenna operation. A data processing system is operably connected to one or more corresponding data processing connections in the set of connections, the data processing subsystem being separate from the support structure and being configured to provide inputs to the interface of the antenna enclosure, to control beamforming for the antenna array, and to perform signal processing on the outputs of the antenna array. A cooling system is attached to one or more corresponding cooling connections in the set of connections, the cooling subsystem being separate from the support structure and being configured for supplying cooling to the antenna enclosure and to the data processing subsystem. An alternating current (AC) power subsystem is operably connected to one or more corresponding power connections in the set of connections, the AC power subsystem being separate from the support structure and being configured for supplying power to the antenna enclosure, the data processing subsystem, the cooling subsystem, and to a direct current (DC) power conversion subsystem.

In some embodiments, at least one of the data processing subsystem, the cooling subsystem, and the AC power subsystem, is configured to be functionally and independently scalable based on at least one of a size of the antenna array and on operational requirements of the antenna array. In some embodiments, the antenna assembly is calibrated before mounting the antenna assembly to the support structure.

Details relating to these and other embodiments are described more fully herein.

BRIEF DESCRIPTION OF THE DRAWINGS

The advantages and aspects of the described embodiments, as well as the embodiments themselves, will be more fully understood in conjunction with the following detailed description and accompanying drawings, in which.

The drawings are not to scale, emphasis instead being on illustrating the principles and features of the disclosed embodiments. In addition, in the drawings, like reference numbers indicate like elements.

DETAILED DESCRIPTION

The following detailed description is provided, in at least some examples, using the specific context of target detection systems (e.g., radar systems) configured to detect, track, monitor, and/or identify targets, where targets can include (but are not limited to) aircraft (both unmanned and manned), unmanned aerial vehicles, unmanned autonomous vehicles, robots, ships, spacecraft, automotive vehicles, and astronomical bodies, or even birds, insects, and rain. At least some embodiments herein are usable with any systems involved with any radar applications, including but not limited to military radars, air traffic control radars, weather monitoring radars, etc. Some embodiments described herein are usable for the mounting and configuration of any type of elevated surveillance system.

Increasingly, users and purchasers of radar systems can prefer to avoid the cost, risk, and extended timelines to develop and deploy new radars. Recent radar developments and advances have focused on scalable phased array technology modularization, to reduce engineering required to tailor radar sensitivity and apertures. Illustrative examples of such modularization are described in the aforementioned several commonly assigned patents and patent applications. Using scalable systems, such as the scalable phased array antennas described in the aforementioned patent documents, can mean that radar users and customers are more willing to adapt these mature, available radar solutions to new mission spaces. While cost and schedule risks are significantly reduced by using mature production hardware, radar user customers may compromise on mission requirements, despite using scalable systems, to expedite fielded capability. Furthermore, scaling phased arrays and supporting subsystems may require significantly more engineering support and cost than anticipated.

Figure 1:
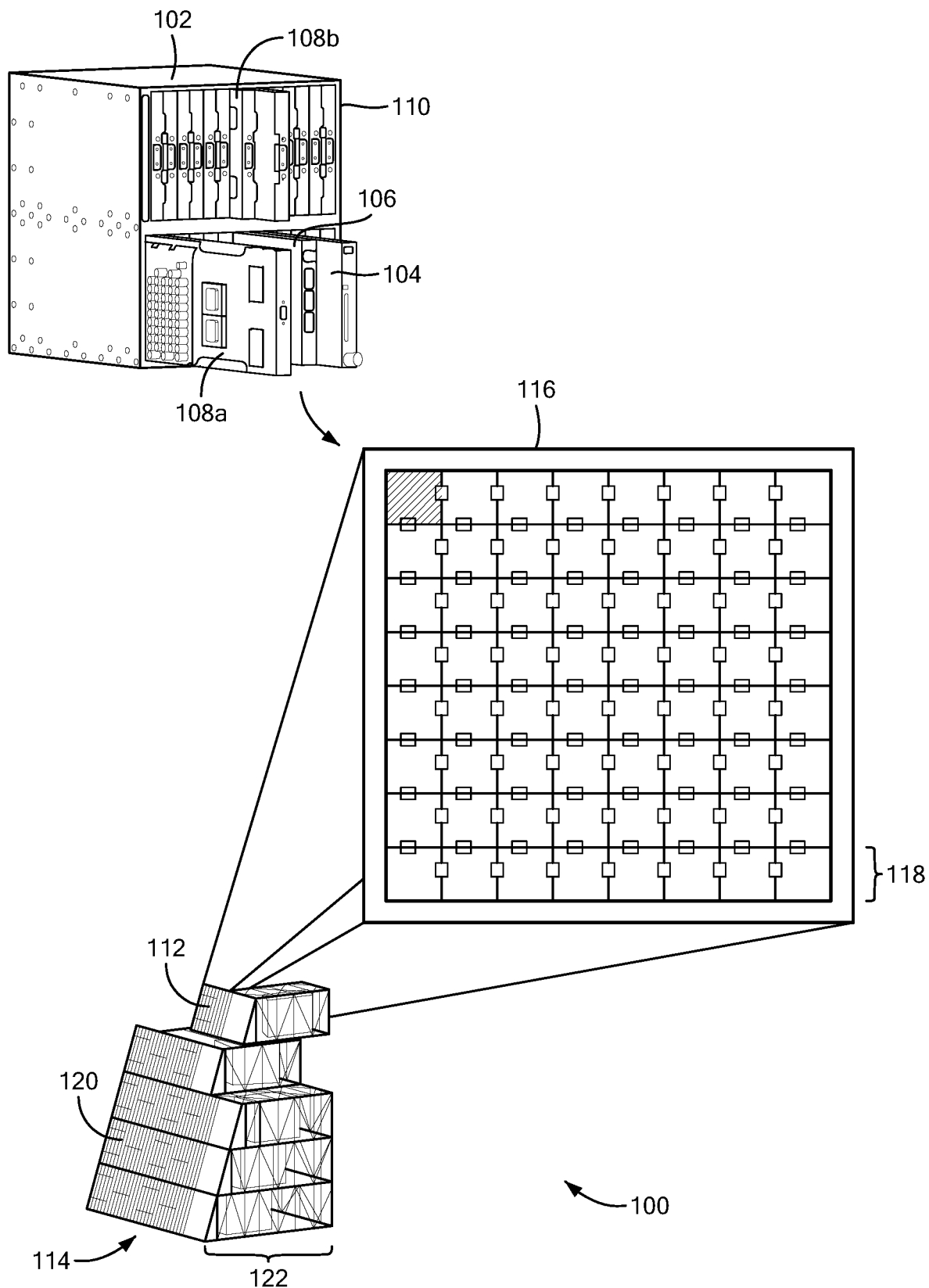
FIG. 1 is an illustration of an antenna array constructed using radar modular assemblies (RMAs), in accordance with one embodiment.

Further, although antenna architectures such as the antenna architecture 100 of FIG. 1 have advantages in that it is expandable, expansion of the antenna array does not work in all circumstances. In some instances, expansion of an antenna array cannot work because available power, cooling, and processing cannot easily scale or be upgraded to match the new antenna array requirements, without requiring new design and test. For very large scale apertures, stacking MRA sub sections 112 and/or placing them side by side, is workable. However, for the example antenna architecture 100 of FIG. 1, if a new unique array structure and back structure for each radar size and performance is needed, the architecture cannot always be easily upgraded in size at a later date without extensive rework. While use of modular building blocks to scale phased arrays and to reuse production components across radar families is becoming more commonplace in radar design, this approach generally does not extend beyond antenna sub-systems without significant re-engineering. Moreover, recent implementations require lengthy downtime associated with field upgrades and calibration.

One solution proposed has been to increase system modularity by packaging radar components with the antenna. This can be workable and addresses issues for very large scale apertures. However, this approach is not always efficient for multi-faced systems that require elevation (towers), particularly for applications where smaller and/or more lightweight antennas are required.

Radar Modularity in some past systems has mainly focused on antenna scalability via building blocks such as the aforementioned Radar Modular Assembly (RMA). The process to upgrade scalable antennas in the field can be cumbersome, leads to substantial mission downtime, and requires in-field calibration. Each new antenna configuration can result in further design efforts needed for features like antenna structures, support systems including power, cooling, uninterruptible power supplies (UPS), and system engineering to include integration, test, and system verification. Ultimately, in some instances, the extensive engineering necessary to upgrade existing systems can lead to costly projects where customers and radar users can lack confidence that the upgraded system has a high system technology readiness level (TRL).

Recent concepts for building blocks at a higher level of integration focus on large, rapid system scaling (e.g., modular radar assemblies (MRA)), as mentioned in the aforementioned '954 patent application. These other building block concepts can require ground platforms due to size and weight, but the nature (e.g., size and ground coverage) of the ground platforms can limit site emplacement options near population centers. In addition, these building blocks can require use of relatively large land areas for 360 degree coverage. In some instances, these concepts employ very large building blocks that are not well suited for downsizing. Ground platforms can be beholden to local topography for situations where look down surveillance is required. The nature of these large systems can limit the practicality of applying them for most air surveillance missions requiring tower basing.

In some instances, users/customers such as the military or other government entities may require and/or prefer a range of radar capabilities and performance but may compromise on requirements to simplify the acquisition, minimize DOTMLPF (Doctrine, Organization, Training, Materiel, Leadership, Personnel, and Facilities) complexity and/or expedite deployment timelines for delivery and deployment of radar systems. Thus, customers/users in some instances have to make tradeoffs, such as:

Risk Mitigation via high Technology Readiness Level (TRL): there can be a willingness to purchase available, mature systems versus choosing new system development.

Capability Compromise: users may accept performance limitations of some systems, assuming that a solution that meets, e.g., 80% of requirements is better than no solution.

Selection based on Lowest Cost: cost-sensitivity with many users may mean even greater emphasis on maximizing capability within constrained budgets.

Mandating System Extensibility: there can be a preference for radar systems and other systems that are open systems, and/or which provide modularity, and scalability, to enables tailoring the initial acquisition to budget while providing a growth path to objective capabilities.

Acquisition Agility: Extensive use of Other Transaction Authority (OTA), Indefinite Delivery, Indefinite Quantity (IDIQ), and other acquisition methods to accelerate fielding In certain aspects, at least some embodiments described herein attempt to address at least some of these aforementioned concerns and issues. In addition, at least some embodiments described herein provide novel configurable radar systems that can help to address one or more of these needs. In certain embodiments, a composable radar solution provides a novel approach to define, configure, and deploy mature high performance radars for a variety of customers, missions, and requirements. In certain embodiments, using a fully modular, building block approach, certain embodiments provide tower-based radar systems that are configured using mature, verified building blocks with little engineering support required. The approach demonstrated in at least some embodiments can help to addresses very specific customer needs including:

1) Use of high TRL phased array and key sub-system technology
2) Establishing an approach for capability insertion vs development delays
3) Tailoring radar solutions to mission requirements and/or budget limitations without re-engineering
4) Rapid implementation of growth capability with very low downtime
5) System performance verification via simulation vs expensive flight testing
6) Use of mature, identical system components to provide DOTMLPF efficiencies In certain embodiments, as described herein, the radar system that is provided is created using modular "Building Block" components that are derived from mature products and product building blocks. Creation of these components, in accordance with at least some embodiments, helps establish a catalog of standardized configurations for customers (advantageously having predictable costs/pricing). At least some embodiments herein provide pre-engineered building blocks that are usable across not just across various radar system configurations, but also in other types of systems that incorporate any or all of the components.

In certain embodiments, radar system configurations are defined to support a wide range of radar missions and capabilities (Civilian and Department of Defense (DoD)). In certain embodiments, a family of configurations defines commodity (off-the-shelf) radars—maturity, availability, pedigree, having capabilities that are known and not questioned. In certain embodiments, the use of standardized building blocks and standardized configurations, as described further herein, can be matched, advantageously, to known mission demands and/or budget. In certain embodiments, use of the standardized building blocks can help to eliminate or reduce design and development time for subsequent radar applications. Yet another advantage of the standardized components associated with at least some embodiments herein, is repeatable production, deployment, and performance.

Figure 2:
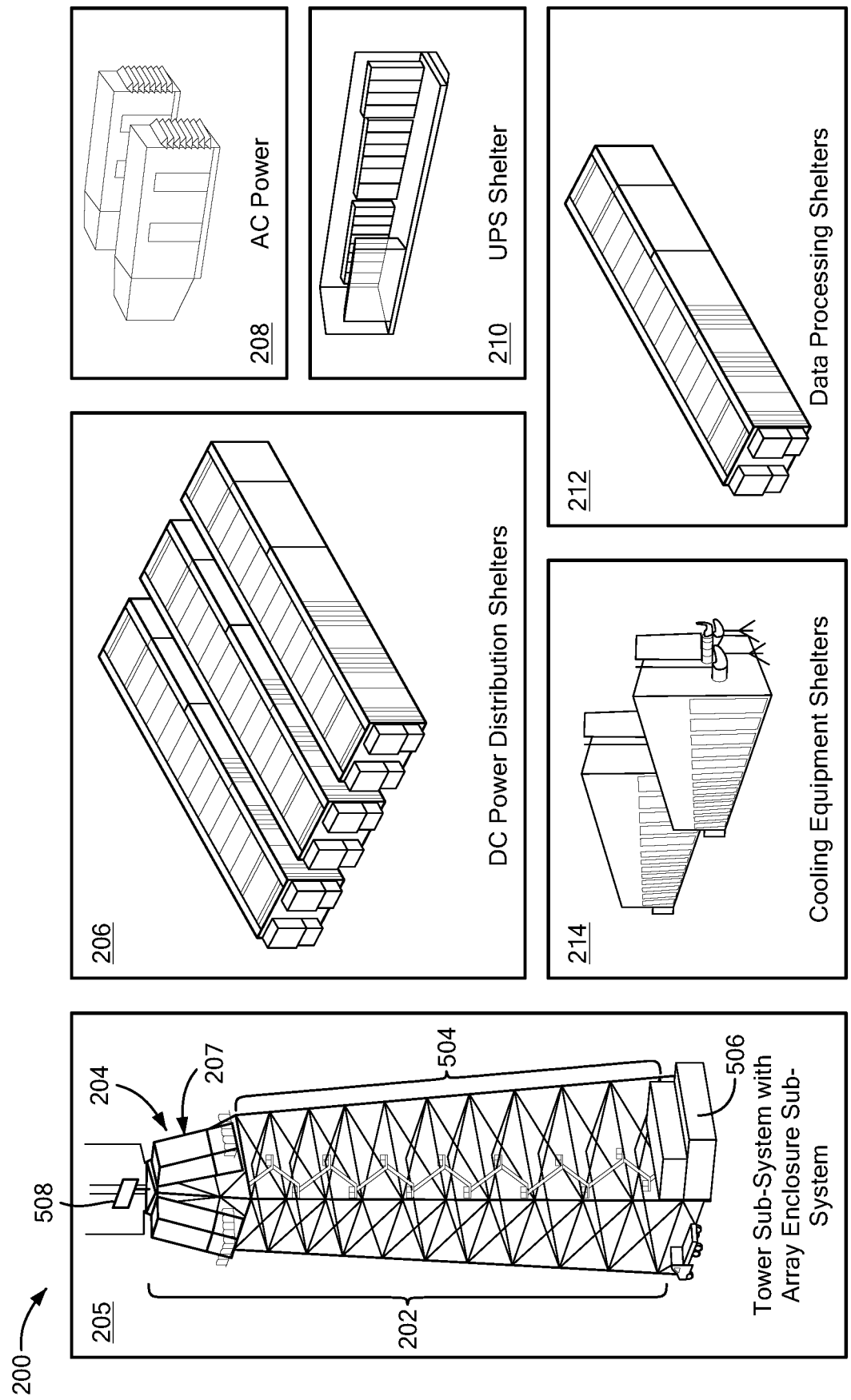
FIG. 2 is a first illustrative block diagram of radar system elements in accordance with one embodiment.
Figure 3:
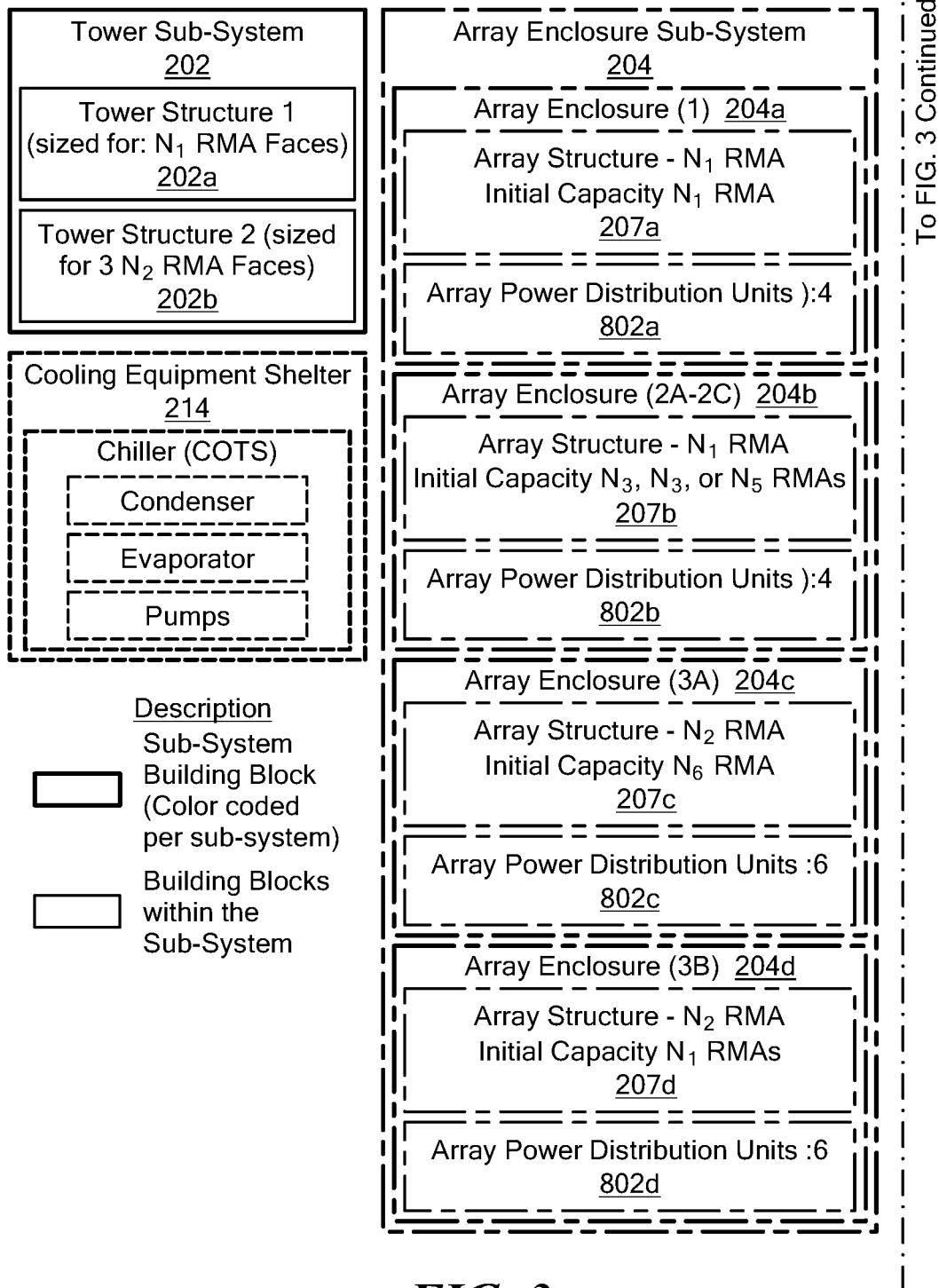
FIG. 3 is a second illustrative block diagram of radar system elements, depicting in greater detail the radar system elements of FIG. 2, in accordance with one embodiment.
Figure 3:
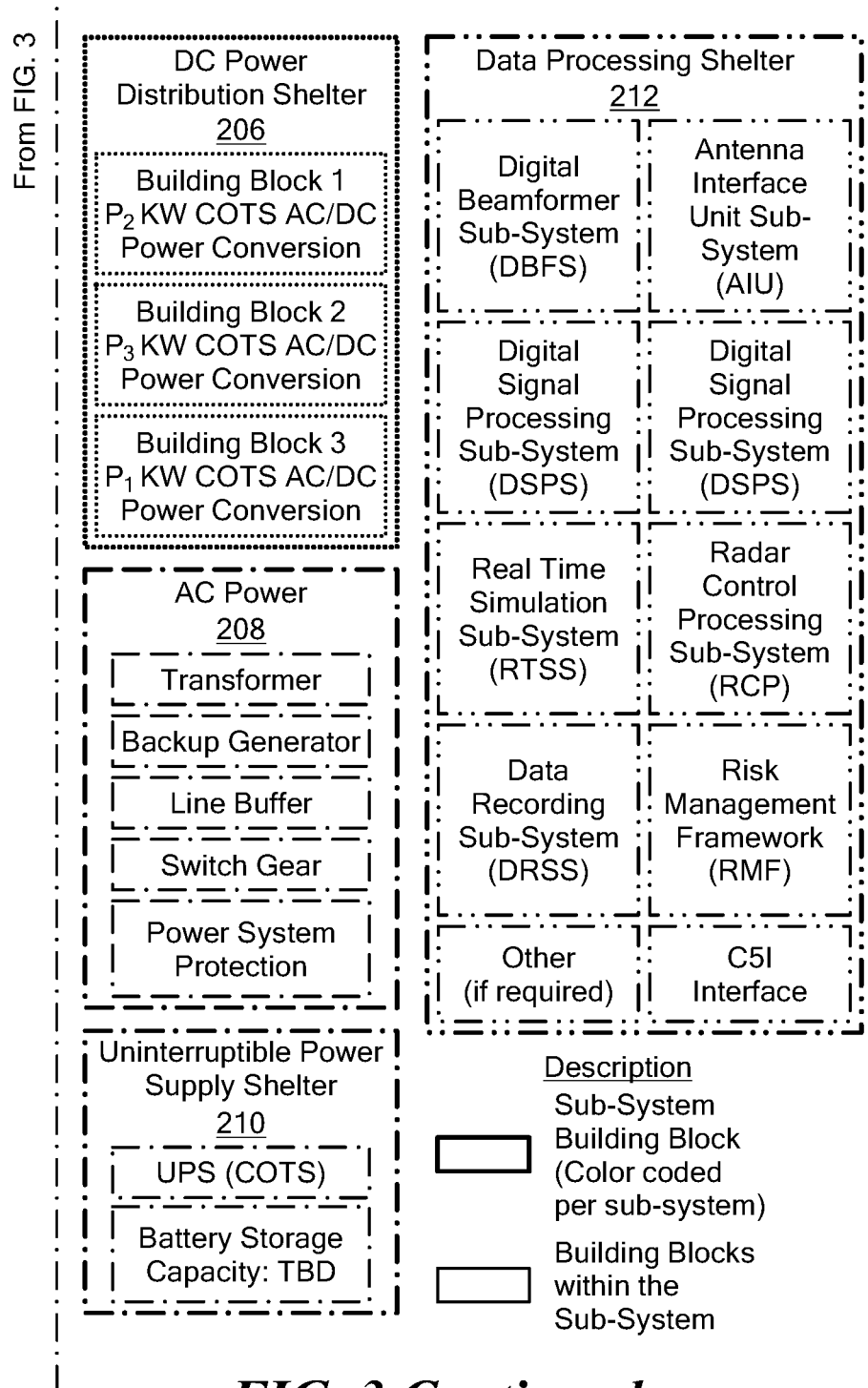
Figure 24:
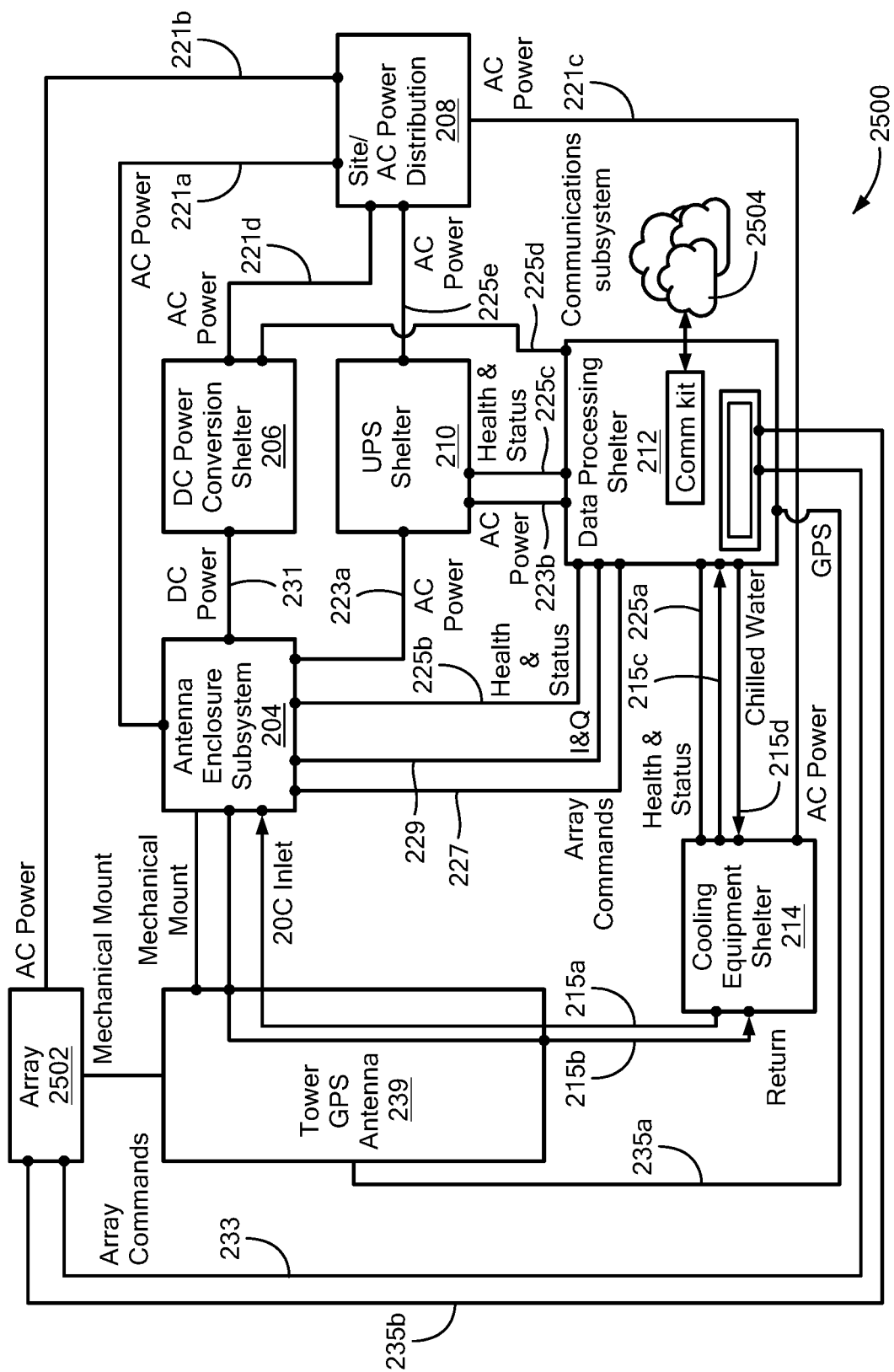
FIG. 24 is an illustrative block diagram example of physical interfaces between radar systems elements in an exemplary composable radar system, in accordance with one embodiment.
Figure 25:
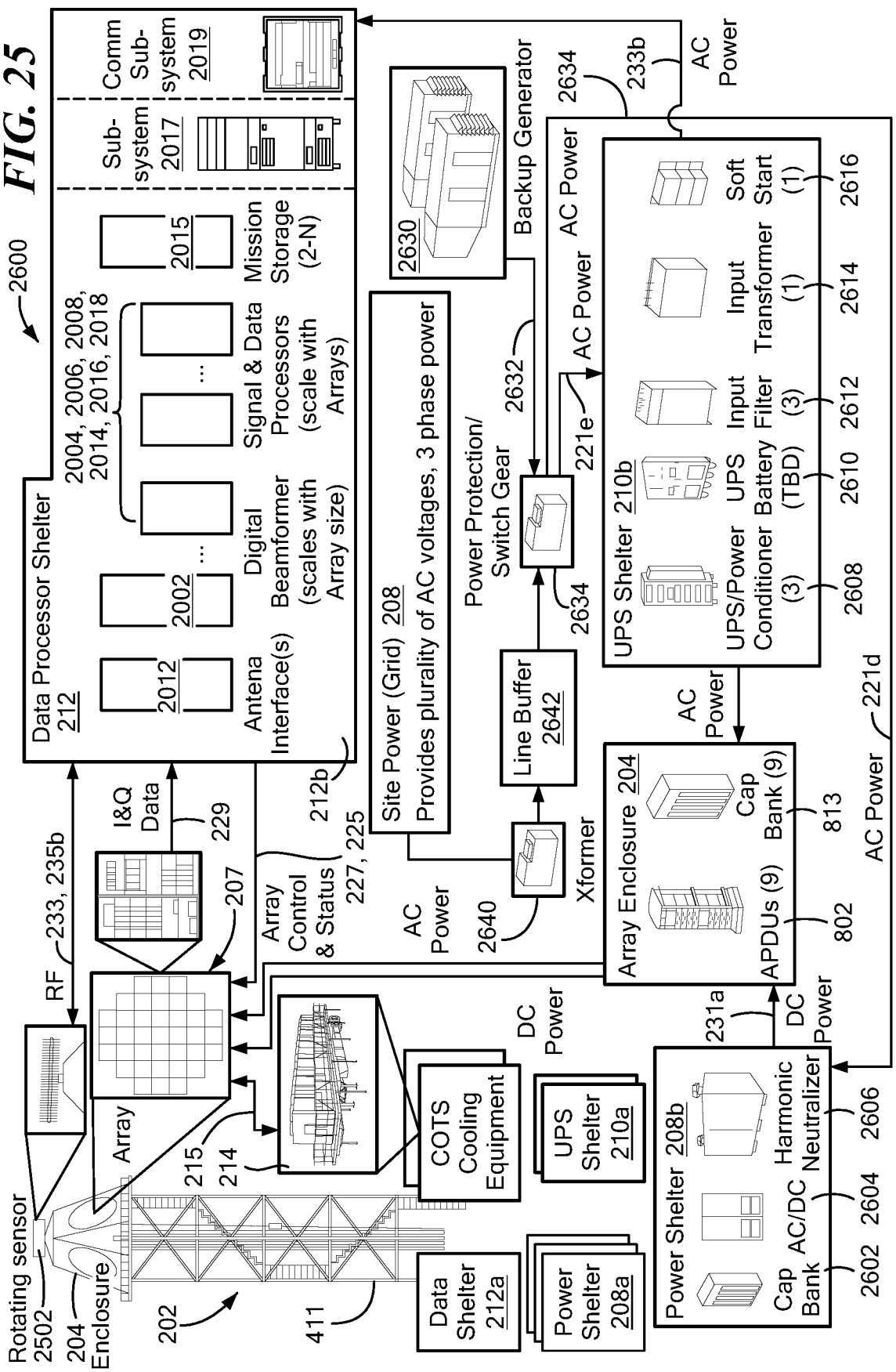
FIG. 25 is an illustrative block diagram example of the composable radar system of FIG. 3 as adapted to work in an exemplary surveillance radar system, in accordance with one embodiment.

FIG. 2 is a first illustrative block diagram of radar system elements, for an exemplary composable radar system 200 in accordance with one embodiment. FIG. 3 is a second illustrative block diagram of the radar system 200 of FIG. 2, depicting in greater detail the radar system elements and subsystem of FIG. 2, in accordance with one embodiment (the details on the subsystems shown in FIG. 3 are explained further herein). The exemplary composable/modular radar system 200 includes a plurality of radar system subcomponents (also referred to herein as "Radar Building Blocks" or "RBBs," each respective subcomponent (other than the tower structure 202) advantageously is housed in a modular, relocatable shelter or other protective housing, with defined interfaces and connections to other RBBs (as described further herein. Each RBB, in certain embodiments, is pre-tested, pre-validated, and/or pre-configured and ready for use. Each RBB is configured to be in operable communication with certain of the other RBBs (e.g., as indicated in FIGS. 24 and 25 herein) and/or with the antenna array 207 (described further herein). In certain embodiments, the operational connections between the antenna array 207 RBB and its antenna enclosure 204 RBB, and the other RBBs, are made through cabling and other connections that are routed through and/or in the tower 202 (which itself is also an RBB and is itself, in certain embodiments, able to be constructed using one more modular subcomponents, which themselves also are viewable as RBBs.

Referring to FIGS. 2 and 3, the exemplary composable radar system 200 includes a first tower antenna structure 205 (which includes one or more antenna enclosures 204 and a supporting tower structure 202), one or more direct current (DC) power distribution shelters 206, one or more alternating current (AC) power shelters 208, an uninterruptible power supply (UPS) shelter 210, one or more data processing shelters 211, and one or more cooling shelters 214. Details on each of these components is described further herein. In addition, in certain embodiments, the shelters can be configured to be relocatable and/or stackable. In certain embodiments, the shelters housing some or all of the radar system 200 subsystem components, can be comparable in size to conventional cargo containers used for shipping.

The system of FIGS. 2 and 3, in certain embodiments, provides a novel architecture, integrated together in a unique way, where the architecture advantageously can reuse and adapt mature array technology, commercial off the shelf (COTS) equipment, and/or standalone shelters in a novel combination, including with a new tower support structure 202 having built in antenna support 502 (See FIG. 5 herein), to enable a new, modular, scalable, relocatable, tower-based radar product. The subsystems 202-214 of FIGS. 2 and 3 correspond to well-defined new Radar Building Block (RBB) sub-systems. Use of the RBB subsystems of FIGS. 2 and 3 enables radar systems to be readily tailored to mission requirements with little or no new development.

The antenna enclosure 204 (described in greater detail herein in FIGS. 4-11) provides, in certain embodiments, a fully enclosed, electromagnetic interference (EMI) shielded, high-altitude electromagnetic pulse (HEMP) resistant, and weather tight integrated structure for a scalable phased array antenna (advantageously constructed using modular Radar Modular Assembly (RMA) antenna elements or other functional building block (FBB) elements), such as those available from Raytheon corporation and/or other manufacturers, and associated array power distribution. The antenna enclosure 204 enables delivery and site installation of a fully integrated antenna that, in certain embodiment, has been calibrated and tested already at the factory where it was manufactured (although this is not required for all embodiment). In some embodiments, the antenna enclosure includes fully calibrated cables that are already connected within the enclosure, but this is not required for all embodiments. The antenna enclosure 204, in certain embodiments, installs in hours to tower mount (e.g., to the tower 202) with a crane lift (see FIG. 11 herein) or other suitable lift, and the antenna enclosure and the antenna support tower 202 are specifically engineered for quick, simple, proper (and, advantageously, mechanical) alignment (described further herein in connection with FIGS. 6 and 11).

In certain embodiments, antenna enclosures 204 are designed for fully populated arrays but can be populated with smaller apertures for mission specific requirements or budget. This is described further herein, especially in connection with FIGS. 4A-4C and 11). An additional advantage of the antenna enclosure 204 of FIGS. 2 and 3 is that it can enable, in certain embodiments, rapid sensitivity growth by replacing an existing antenna enclosure 204 (which might be less than fully populated) with a fully populated antenna enclosure 204 (see FIG. 11 herein), with very little down time. In an exemplary embodiment, for 360 degrees of coverage, a tower antenna structure 205 can include three antenna enclosures 204, but this is not limiting. If desired and/or if appropriate to a given application, a tower antenna structure can be implemented with one to four antenna enclosures. The number of antenna enclosures 204 that can be used will be limited by the configuration, shape, and supporting capability of the tower structure 202. As those of skill in the art will appreciate, different geometries and footprints of tower 204 can be created, to implement supporting structures 502 configured hold even more antenna enclosures 204 and/or different orientations of antenna enclosures 204. However, these can be less than advantageous from a cost, coverage (e.g., of radar signal) perspective. In certain embodiments, the antenna enclosure 205 includes an antenna 207 made using the aforementioned RMA-based building blocks (e.g., as described in the aforementioned and incorporated by reference '222 and '448 patents), but this is not limiting. The concepts and structures shown in the Figures herein are applicable to any scalable block or functional building block, as will be appreciated.

Figure 5:
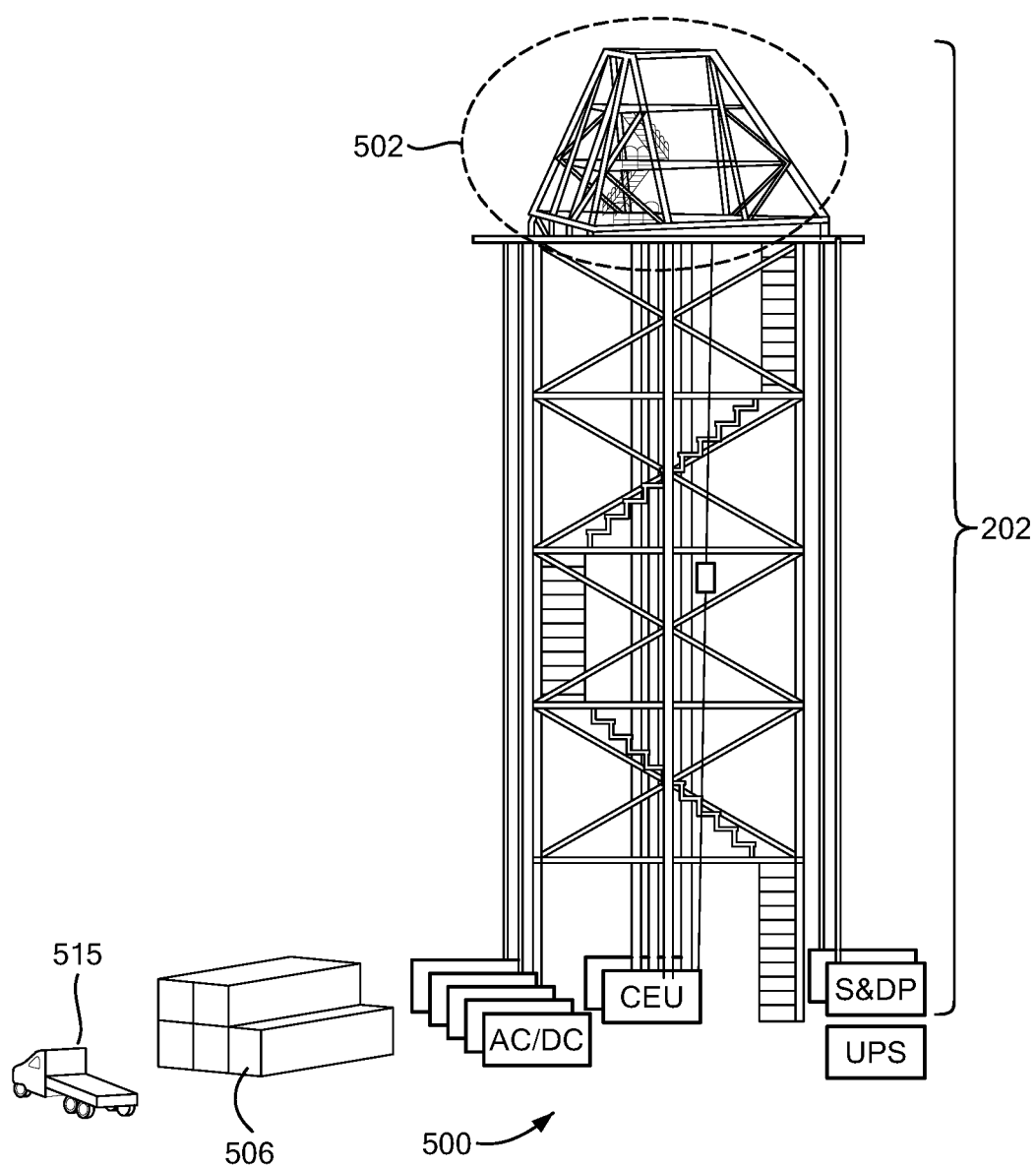
FIG. 5 is an illustration of an exemplary modular tower, in accordance with one embodiment.
Figure 6:
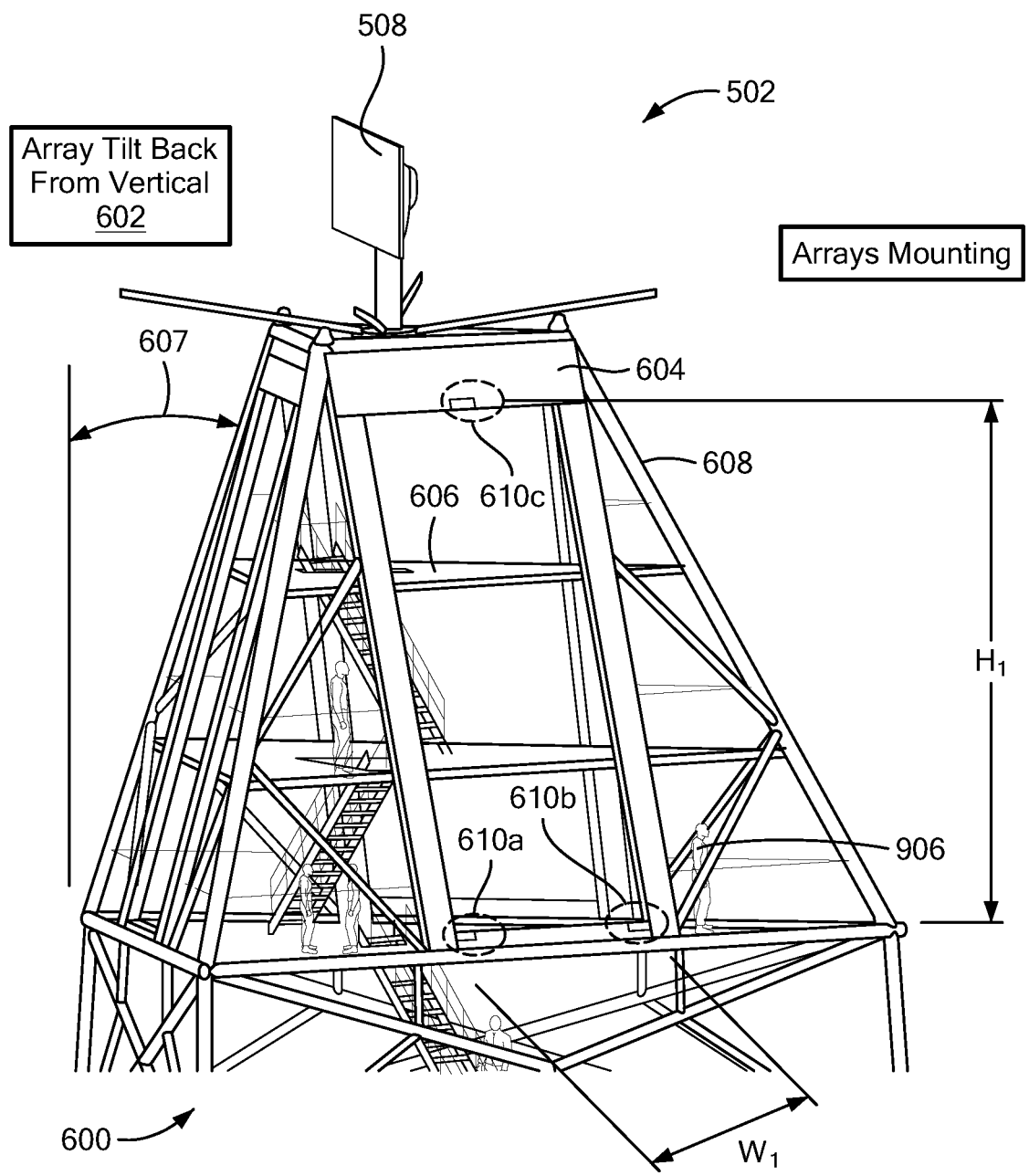
FIG. 6 is an enlarged view of one portion of the modular tower of FIG. 5, showing mounting points, mounting angles, and alignment pins, in accordance with one embodiment.

The system 200 of FIGS. 2 and 3, in certain embodiments, also includes a novel tower design 202 having with integrated antenna enclosure support structure 502 (shown and described in greater detail in connection with FIGS. 5-6 herein). Referring briefly to FIGS. 5 and 6, an exemplary radar system 200 will have one such tower 202, where in the support structure portion 502 is configured to support from one to four antenna enclosures 204. In certain embodiments, the tower subsystem 202 is configured and designed specifically for rapid integration of the antenna enclosures 204. In various embodiments, three antenna enclosures 204, associated with three corresponding antenna array faces, can be equally populated with antenna elements. In certain embodiments, the array sizes and coverage of the antenna array 2017 faces can vary. In addition, in some embodiments, combinations of pre-configured array populations can be tailored to mission requirements or limited budgets, and then later upgraded. In certain embodiments, the tower subsystem 202 is provided in modular sections, to enable users/customers to select desired height based on mission and topography. It should be noted that the implementation of FIGS. 2 and 3 applies to any scalable antenna regardless of frequency.

In certain embodiments, the tower subsystem 202 is deployed in advance of the other radar subsystems of FIG.

200, so that the antenna enclosures 204, can be craned or otherwise lifted onto the tower and aligned mechanically (see FIGS. 6 and 11 herein), without further engineering needed, but this is not limiting. It can be possible for other radar building block (RBB) elements or subsystems of FIGS. 2 and 3 to be provided in different order. However, in certain embodiments, the array enclosures 204 do require that the tower subsystem 202 be installed and ready to receive the antenna enclosures 204. The tower subsystem 202 can include, in certain embodiments, a tower sectioned for 3-4 discrete antenna heights, such that the tower 202 is provided in multiple modular pieces, for installation at the site.

The system 200 of FIGS. 2 and 3 also include another novel RBB in the form of a power shelter, such as a DC power distribution shelter 206, where in some embodiments, the DC power distribution 206 and AC power distribution 208 are in separate shelters. In certain embodiments, the power shelter can provide AC/DC Power conversion. In certain embodiments, each respective antenna enclosure 204, has its own respective corresponding power shelter structure, including its own dedicated DC power distribution shelter 206 and its own dedicated AC power shelter 208. In certain embodiments, each respective antenna enclosure 204 also has its own cooling shelter 214, data processing shelter 212, and/or UPS shelter 210. This is explained further herein. Engineered power "Building Blocks" such as the shelters 206 and 308 can combine/scale across the range of potential antenna configurations, as will be appreciated. For example, they can be scaled easily to support an upgraded antenna enclosure 204 having more elements and greater needs for power and power distribution, as will be appreciated. It can be possible, therefore, to replace or upgrade one of the three antenna enclosures 204 on a tower, and also be able to easily replace some or all of its corresponding functional supports (power, cooling, data processing, for example) simply by either swapping shelters or adding components within a shelter.

Some of the other components in the radar system 200 of FIG. 2 can, in certain embodiments, make use of shelter-level building blocks that leverage COTS or existing Program of Record (PoR) Designs. That is, if a component is already used/proven for a given "program of record" (e.g., in which the antenna enclosure/tower is being used) or product, it can be viewed as mature and appropriate for re-use in other systems of that same program. For example, in certain embodiments, both the UPS shelter 210 and/or the cooling equipment shelters 214 can be implemented using COTS products. In at least some embodiments, the components are independently functionally scalable, to adapt capacity or functions provided based on needs of other components in the system. In one embodiment, the UPS shelter 210 leverages scalable COTS UPS/battery storage equipment. In one embodiment, the cooling equipment shelter 214 is implemented using a scalable COTS chiller designed to meet specifications of the radar system, especially for cooling the antenna. The cooling equipment shelter 214 function similarly is independently scalable, so that, if, for example, the size of the antenna array increases (thus requiring additional cooling), either additional cooling features can be added to the cooling equipment shelter 214 or an additional cooling equipment shelter 214 can be provided. As with the aforementioned power shelter 206, these other RBB shelters can be associated with and coupled to, a respective antenna enclosure 204.

In further embodiments, the data processing shelter 212 can be implemented to reuse processing that is already in use or approved, such as PoR backend processing (TRL-8, i.e., technology readiness level 8, meaning the actual system has been completed and has been mission or "flight qualified" through test and demonstration). As is understood by those of skill in the art, hardware and software technology associated with a TRL-8 system has been proven to work in its final form and under expected conditions, with inherent scalability. In certain embodiments, for example, the signal and data processing shelter 212 includes 100% re-use of S-band products for radar processing and associated backend radar architecture, all housed in the data processing shelter 12 (this radar band is not, of course, limiting). As will be appreciated, during setup, there may still need to be minor configuration settings done for the data processing shelters 212.

Figure 4A:
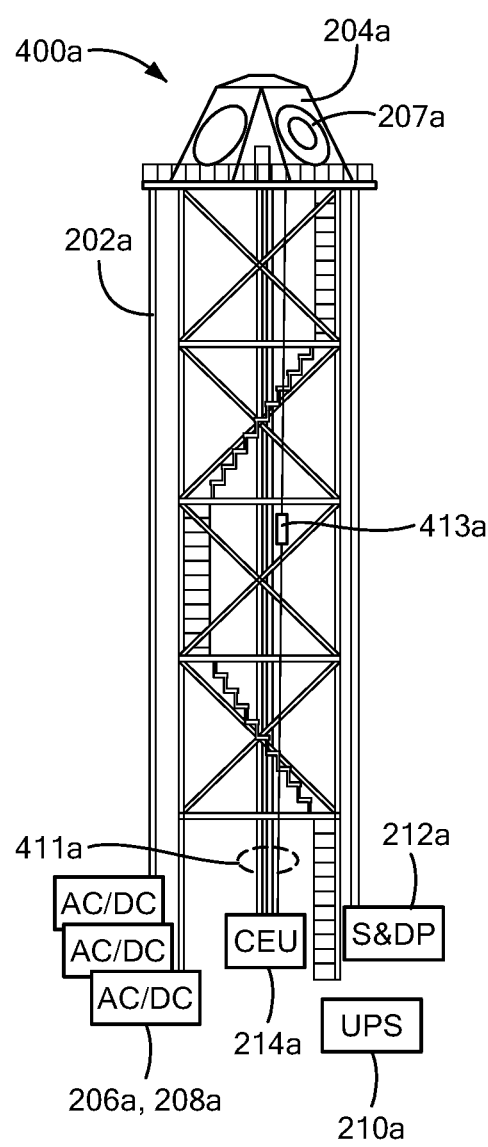
FIGS. 4A and 4B are first and second exemplary embodiments of a composable radar on towers, using the radar system elements of FIG. 2, in accordance with some embodiments.
Figure 4B:
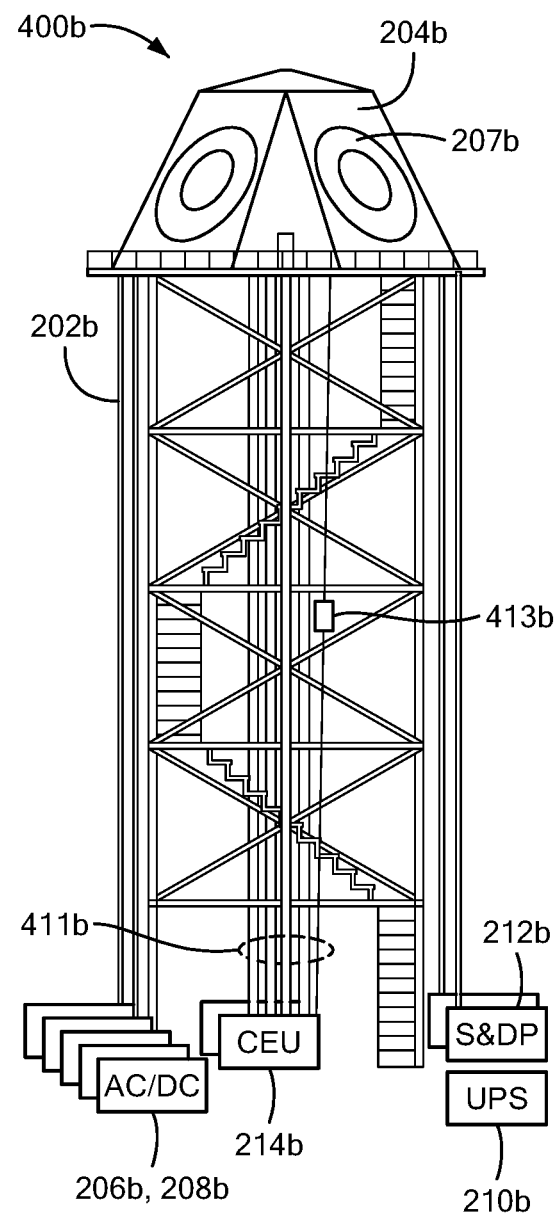

FIGS. 4A and 4B are first 400a and second 400b exemplary embodiments of a composable radar on towers, using the radar system elements of FIGS. 2 and 3, in accordance with some embodiments. The tower 202 of FIG. 4A has an integrated antenna support structure (shown in greater detail in FIGS. 5A-7B, see antenna support structure 502 of FIGS. 5A and 6) that is an open structure configured to support up to three antenna enclosures 204a, each having a corresponding array 207a and each, in certain embodiments, is associated with its own set of respective RBBs (e.g., the subsystems of FIGS. 2 and 3). Referring briefly to FIG. 5, FIG. 5 is an illustration of an exemplary modular tower 202, in accordance with one embodiment.

FIG. 6 is an enlarged view 600 of the top portion 502 of the modular tower 202 of FIG. 5, showing that the antenna support portion 502 includes a plurality of mounting points, has orientation to maintain certain mounting angles, and further includes alignment pins 906, in accordance with one embodiment. In certain embodiments, this top portion 502 is configured to have three faces, where each face is configured to be coupled to a respective antenna enclosure 204. For example, in one embodiment, the top portion 502 can have a "teepee" like or triangular pyramid shaped top (e.g., with three faces). In another embodiment, the top portion 502 can be implemented using a three-dimensional trapezoidal prism shaped top (with narrowest end towards the top and base approaching the dimensions of at least a portion of the tower structure base, such that each face has a substantially trapezoidal shape). In other embodiments (not shown, but readily understood), the top portion 502 also could be implemented using a triangular prism shape and/or a pyramid shape. As will be understood, any shape can be implemented using four faces instead of three (e.g., 4 trapezoidal faces vs 3). Even more faces are possible, depending on the application.

Advantageously, the top portion 502 can be implemented using any shape that can be adapted to support the shape of the antenna enclosures 204 (which for illustrative purposes, in the embodiments herein, are shown to have substantially rectangular three dimensional shapes). The tower 202 itself can have any desired geometric shape, but advantageously is one of square, rectangular, diamond, octagon, and triangular. The tower 202 overall shape in the figures is shown as being constant, but this is not limiting. The tower 202 shape could, for example, have a variation in size in its sections and/or could have one or more tapers, could have varying kinds of shapes (e.g., so called "beefy square" shaped, Eiffel tower shaped, etc.) as those of skill in the art will appreciate. The particular shape of the antenna enclosure support 502 portion is not limiting, but advantageously, this top support portion 502 is configured to ensure the weight of the antenna enclosure 204, when loaded as needed with array elements to form an array 207, can be fixedly and securely held into place via the mounting 604.

One advantage of using an open, truss-like support structure as shown in FIGS. 4A-4B and 5 (as well as the antenna enclosure support portion 502 as shown in FIG. 6), is that it is not a "building," so site requirements and building codes, etc., that are applicable to buildings (especially those in which humans might be present), such as certain types and numbers of means of egress, fire protection, airflow, drainage etc., might not be applicable to or as onerous for a structure such as a an open, truss-like tower, even if the tower includes ladders and steps, or floors, to enable human accessibility to some portions. This can enable the support structure 202 to be simpler, lighter, less costly, quicker to erect/build, simpler to maintain, easier to take down, etc., as compared to the enclosed building-like structures to which antenna arrays of this size are often attached. Because the support structure is open and not entirely enclosed by walls (in contrast to support structures that are completely enclosed, like buildings), it can be possible that other additional health and safety requirements (e.g., for enclosed spaces), e.g., relating to temperature, ventilation, and the like, can be simpler and/or easier to achieve.

Referring to FIGS. 5 and 6, it can be seen that the tower 202 includes a top portion 502 that provides an open structure having the ability to support, using supports 604, a corresponding antenna enclosure 204. The top portion 502 includes several "floor" levels 606 used by support personnel 906 (including a top "penthouse" level 607), and the support frame 604 of the top portion 502 is tilted from the vertical, this is exemplary and not limiting. Those of skill in the art will appreciate that in certain embodiments and applications, the top portion 502 can be constructed and arranged to mount an antenna enclosure at other orientations and a variety of angles (or even at no angle).

In certain embodiments, the tilt of the antenna enclosure support frame 604 is related to the array scan capability which is defined to scan requirements for the mission space. In certain embodiments, the tile from the vertical could be greater than the illustrated tilt, but this can tend to result in a possible loss of scan towards horizon. In many missions and applications, the preponderance of the surveillance volume is near the horizon. As will be appreciated, the greater the tilt back, the higher the scan angle (and the higher the accompanying scan loss towards horizon.)

The structure 502 of FIG. 6 includes three alignment pins 610a, 610b, 610c, which are outlined in dotted ellipses in FIG. 6. The alignment pins on the bottom, 610a and 610b, are outlined in white, and the alignment pin 610c on the top, is outlined in black. These pins are configured, in certain embodiments, with matching openings formed within the housing portion of a corresponding antenna enclosure 204, as will be understood in the art. Many different techniques for mechanically aligning the structure 502 with the antenna enclosure 204 are possible, as will be appreciated. The alignment pins help to ensure that each antenna enclosures 204 is coupled to the top portion 502 at the correct angle, including with assistance from support personnel 906 during installation, in at least some embodiments. In addition, the top portion array mounting supports 604 are configured to be spaced around the top such that a center of each support 604 is a predetermined distance away from each other, so that the antenna enclosures 204 are configured each to be a known distance or orientation apart from each other, for desired area coverage. This arrangement is merely exemplary and not limiting. For example, it is also possible, in certain embodiments, to have smaller supports, at potentially a reduced cost, if it is known that future growth (e.g., of the number of RMAS, for example) is not expected or needed, or will be limited. In addition, in FIG. 6, the mounting arrangement shows a bolt pattern 604 that is configured to support the weight of a baseline antenna enclosure size, associated with an antenna array of a first size, and also the bolt pattern is configured to support the weight of a "growth" antenna enclosure size (e.g., one having more RMAs or more FBBs). Advantageously, in certain embodiments, the bolt pattern 604 is configured to support more than one size of enclosure (e.g., two enclosures). In certain embodiments, the bolt pattern 604 also can vary based on antenna type (e.g., if antenna type is extended to a C band from a starting S band RMA).

Referring again to FIG. 4A, in this exemplary embodiment, the total height of the tower 202, including the integrated antenna support structure, ranges from very short to very tall, but this is not limiting. The tower 202 is configured, in some embodiments, to support the full weight of 3 fully populated antenna arrays 207 as contained within the antenna enclosure 204. Advantageously, the tower 202 is deployed in advance of the other radar system components. As will be understood, the tower 202 also is configured to permit routing connections and/or cabling and/or conduits (collectively, "connections 411") from the power/electrical (206, 208) and cooling (214) equipment from the ground to the antenna enclosures 204.

The tower of FIG. 4A, in certain embodiments, is configured to support three antenna enclosures 204 that each can have up to a predetermined first baseline number ($N_1$) of RMAs/FBBs as part of the respective array. In an exemplary embodiment, three fully populated smaller enclosures 204 can weigh on the order of 100,000 pounds, and 3 fully populated larger enclosures can weigh on the order of 200,000 pounds. An antenna enclosure 204 can, in certain embodiments, be delivered partially or fully populated, in accordance with a desired radar configuration. In certain embodiments, the antenna enclosure 204 includes one or more integrated Array Power Distribution Unit (APDU) Cabinets (discussed further herein). As will be understood, the radar system 200 can be configured with matched or unmatched antennas (RMA/FBB quantities). Optionally, the tower 202 can include an elevator mechanism 413, to assist in maintenance and installation of components. In certain embodiments, the elevator mechanism 413 is configured to transport maintainer personnel to the top 200 feet of the tower 200.

Referring again to FIG. 4A, the ground shelters shown at the base of the tower 202 include AC/DC power conversion shelters 206a, 208a, chiller (cooling) shelters 214a, signal and data processing 212a, a UPS shelter 210a, are, in certain embodiments, all delivered fully tested. As will be understood, the ground shelters (each representing a modular radar building block providing a specific function) are configured to be fully scalable at the shelter and/or subsystem level. In certain embodiments this scaling can be independent of whether other ground shelters need to be scaled. For example, if the antenna array size changed (e.g., increases, by adding more array elements, additional power capacity may be required (necessitating, for example, additional power shelters), but additional data processing capacity may not be needed, because the existing data processing shelter might itself have sufficient capacity to handle the increased array size. In addition, the electrical, functional, and operational connections 411 can be routed through the tower 202, coupled directly to the tower 202, routed within hollow "legs" of the tower, etc., or otherwise coupled anywhere on or in the tower 202, so that they can reach the antenna enclosure 204. The location shown of the connections 411 is illustrative and not limiting. It is not required that the RBB components that are not directly part of the tower 202 and antenna enclosure 204, be disposed directly adjacent to or very near the tower subsystem 205, so long as those components requiring direct operational connection (e.g., the cooling 215, DC power 206, data processing 212, and AC power 208) can have their operational connections reach the antenna enclosure 204 without degradation or signal loss. In particular, it may be possible to locate the data processing shelter 212 more remotely, such that it could even communicate wirelessly with the other components for some activities. However, because in certain embodiments the data processing shelter 212 also is powered by the AC and/or DC shelters (see interface diagrams in FIGS. 24-25 herein), there can be limits to where the data processing shelter 212 is located. Moreover, in certain embodiments (e.g., the example block diagram of FIG. 3, the example implementation of FIG. 26), because the data processing shelter 212 includes equipment that deals directly with antenna 207, including communications that involve antenna I and Q signals, performing digital beamforming, performing signal processing on signals the antenna array communicates to the data processing shelter subsystem 212, and/or other functions (as shown in block 212 of FIG. 3), it can be important for optimum operation and signal fidelity, that the data processing 212 be located as close to the antenna array 207 as possible.

Referring to FIG. 4B, the second composable radar on towers 400B includes many similar concepts to the composable radar 400a of FIG. 1 but scaled and adapted to increase the capacity of the composable radar 400a to $N_2$ RMAs per antenna array face (in comparison to $N_1$ RMAs per antenna array face for the system of FIG. 4A). In certain embodiments, $N_2=2N_1$, but this is not limiting. In certain embodiments, each RMA corresponds to an approximate 2 foot by 2 foot 'box' (e.g., as shown in FIG. 1), weighing approximately 1000 lbs., so it can be appreciated that the antenna array 207b size of the embodiment of FIG. 2, and the corresponding antenna enclosure 204b weight, will require a considerably larger tower 202b having a larger footprint, to provide more support. Like the tower 202a of FIG. 4A, the tower 202b of FIG. 4B, supports three array faces that are initially populated per customer/user requirements, but which can, as noted above, include up to $N_2$ RMAs per face. This tower 202b, due to its size, provides for more future growth in radar system capacity as compared to the tower 202a of FIG. 5A. In addition, de pending on the size of the FBB that is being used, the FBB could have a size different than the above-listed RMA, where there can be some other number of FBBs per array face, as will be appreciated.

In certain embodiments, the tower 202b has a height that can be very short or very tall; there is no limit to the minimum or maximum height. Similar to the tower 202a, in certain embodiments, the tower 202b is provided in a modular form and includes an integrated antenna enclosure support structure 502, along with other features such as stairwells, and a service elevator Power System 413. The ground shelters 206b, 208b, 210b, 212b, 214b are similar in function to the similarly numbered shelters as described above in connection with FIG. 4A, but it can be seen that the system 400b of FIG. 4B has more of the same kind of shelter (e.g., two cooling shelters 214b as compared to one cooling shelter 214a for the radar system of FIG. 4A). That is, although each antenna enclosure 204 is itself a radar building block, a given respective set of RBB might require multiple of one kind of shelter, etc. In certain embodiments, the shelters can be arranged in a smaller configuration to start, and then added as needed as the arrays are grown. This can enable customers to start with a smaller, lower cost configuration and add to it as needs and funds increase, so the shelter building blocks can scale, even independently, with future growth of the antenna enclosure 203 or any other parts of the radar system. In addition, the interfaces for all shelters to the rest of the system, advantageously, are configured to be identical, enabling easy integration.

In certain embodiments, each antenna enclosure has its own respective power shelter and own respective cooling shelter. In certain embodiments, such as an exemplary three faced, system having a predetermined $N_3$ number of RMAs (where $N_3$ is less than $N_1$; e.g., in certain embodiments, $N_3$ is approximately $\frac{1}{4}^{th}$ the size of $N_1$). With an embodiment having the $N_3$ number of RMAs, it can be possible to have a single DC building block per face, and three DC building blocks can it into an exemplary DC shelter, so only one DC shelter would be needed. However, in certain embodiments, if the size of the array increases, it may be necessary to have multiple DC shelters to accommodate the necessary DC building blocks to support the arrays. In certain embodiments, if the arrays are fully populated, each array face would require its own respective DC shelter.

Figure 4C:
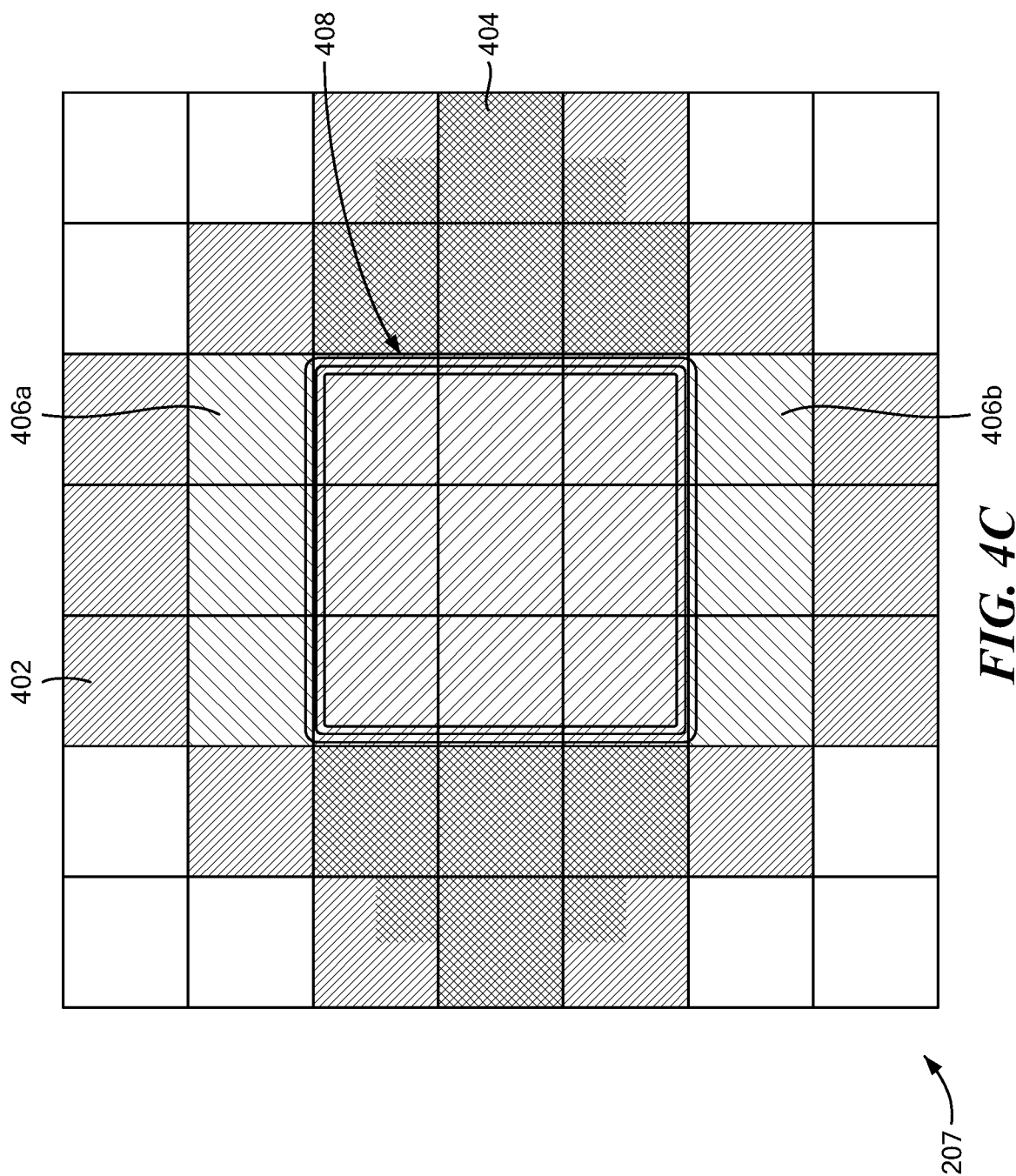
FIG. 4C is further detail of an antenna array of the radar system of FIG. 2, in accordance with one embodiment.

FIG. 4C is further detail of an antenna array 207 of the radar system of FIGS. 2-4B, in accordance with one embodiment. Advantageously, in certain embodiments, the antenna array 207 is sized to mission needs, where in certain embodiments the sensitivity growth is limited by the size of the antenna enclosure 204 itself. In one embodiment, there are two possible sizes of antenna enclosure that can support two different overall capacities of RMAs: In a first configuration, shown in FIG. 4C, the antenna enclosure 204 has 49 possible openings (e.g., from the 7×7 structure) and can support various arrangements of arrays of varying sizes, as indicated by the various shadings. Various "standard" types of antenna configurations can be achieved by populating the basic 7 by 7 structure, such as square antenna arrays 408, rectangular arrays (combining 408 with 406a and 406b), etc. In certain embodiments, one or more of the array locations can be filled with blanks with are weatherproofed and/or weather sealed, which can be cost savings in helping the overall array to be weatherproof and weather sealed, in comparison to using a radome and radiators.

As will be understood, in certain embodiments, for a tower 202 containing 3 different antenna faces, where each face could have a different configuration of array elements and there can be many different possible combinations of arrays, effectively creating 12-24 different types of antennas (even more if the tower 202 of FIG. 4B, which can hold arrays up to $N_2$ RMAs, is used). In another embodiment, the array face of FIG. 4C can be even larger than 7 by 7, as will be appreciated.

FIG. 5 (already mentioned above) is an illustration of an exemplary modular tower 202, in accordance with one embodiment, and FIG. 2 also depicts a similar exemplary modular tower 202. Referring to FIG. 2, in this illustrative example modular tower 202, there is an additional component, such as a different type of sensor or antenna 508 mounted to the top of the tower, but this is not limited to one antenna type. This additional sensor 508 can, in certain embodiments, be configured to be rotatable. The sensor 508 can, for example be an antenna that is part of a radar system used for a different purpose, such as a weather tracking radar, air traffic control radar, etc. It could also be for a completely different system (e.g., cell phone carrier). The component also could be a sensor (e.g., acoustic, optical, thermal, etc.) or even a camera. In certain embodiments and/or certain types of surveillance (e.g., border surveillance), the component could be a sensor such as an electro-optical (EO) or infrared (IR) sensor, where the sensor is configured to cooperate with the radar system mounted below it on the tower 202, to help visually confirm detections and/or to help detect smaller artifacts (e.g., aircraft) having a heat signature). FIGS. 2 and 5 also are helpful to illustrate the scale of the tower as compared to other things like a flatbed truck 515 and several stacked shelters 506, which are, in certain embodiments, the size of conventional shipping containers (which are typically 20 to 40 feet long, 8 to 9.5 ft high, and 8 to 9.5 ft deep). As will be appreciated, in certain embodiments, the combination of array types and number of RMAs/FBBs can dictate then number and type of support shelters needed. And, of course, the embodiments are not limited just to those using RMAs/FBBs or the given size towers and enclosures that are shown. Other scalable types of building blocks are usable, as well, and the concepts described herein are adaptable to many different sizes of towers and enclosures.

Figure 8:
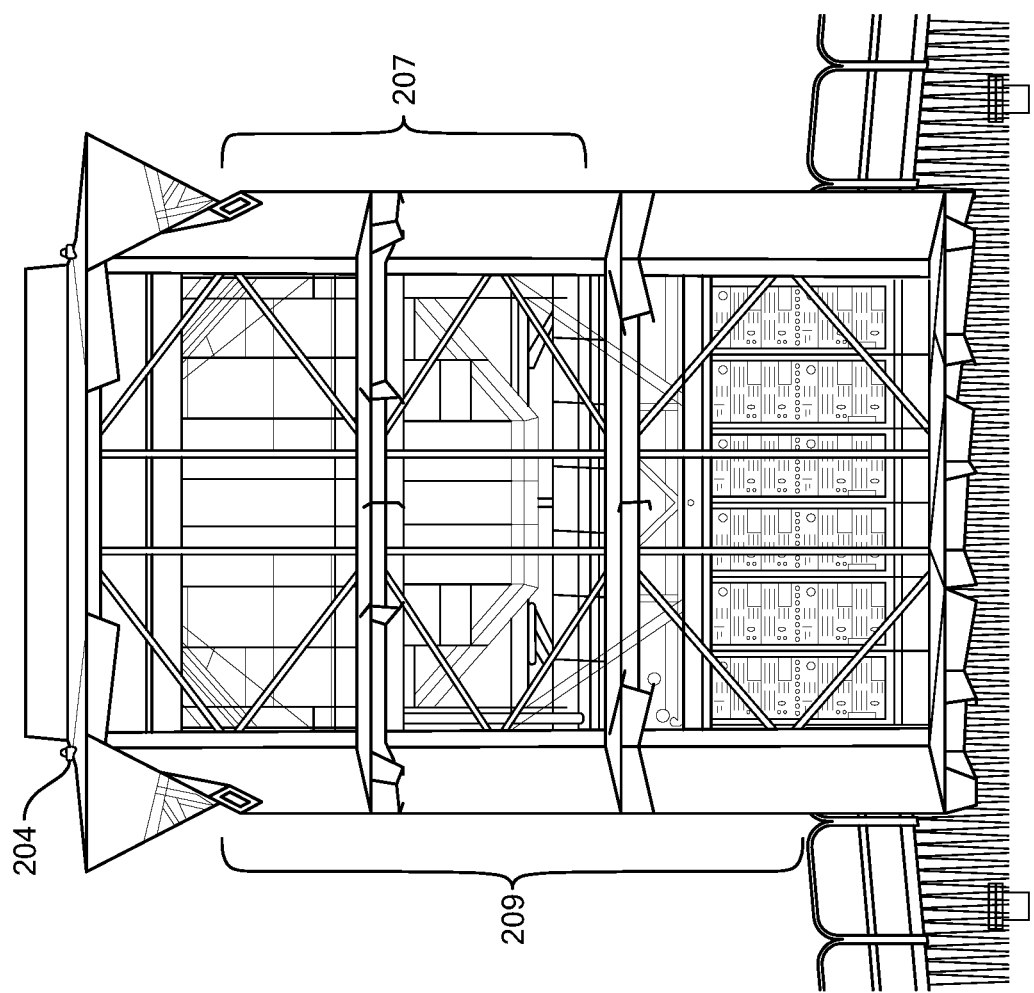
FIG. 8 is a rear view of a self-contained antenna enclosure, with the doors open, in accordance with one embodiment.
Figure 7:
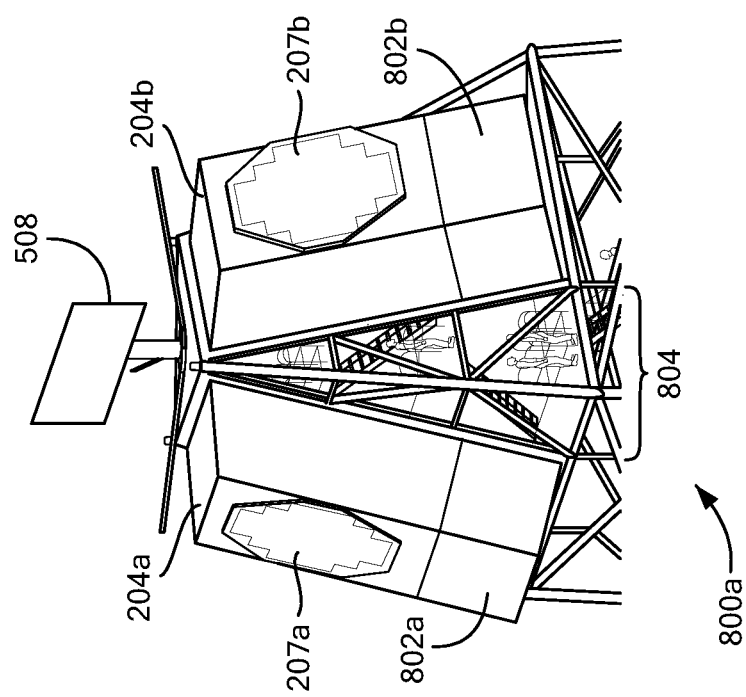
FIG. 7 is a first view of several self-contained antenna enclosures mounted to the top portion of the modular tower of FIG. 5, in accordance with one embodiment.

FIG. 7 is a first view 800A of several self-contained antenna enclosures 204a, 204b (the third enclosure 204c is not visible) mounted to the top portion of the modular tower of FIG. 5, in accordance with one embodiment, and FIG. 8 is a rear view 800b of a self-contained antenna enclosure 204, with the doors open, in accordance with one embodiment. Each antenna enclosure 204 is a self-contained antenna enclosure (in certain embodiments there are three per radar system). A first embodiment (e.g., as shown in FIG. 4A), with a first baseline tower 202 size, uses $N_1$ RMAs. The antenna enclosure 204 is sized to a maximum RMA capacity (e.g., $N_1$ RMAs or $N_2$ RMAs). Depopulated antennas, in certain embodiments support pre-defined but scaled configurations that can have fewer than $N_1$ RMAs/FBBs.

Array Power Distribution Units (APDU's) 802 are integrated into the lower portion of each enclosure 204, in one embodiment. Array Power Distribution Units (Cabinets), in certain embodiments, are configured to service a predetermined number of RMAs. In certain embodiments, each APDC each cabinet is matched to a respective medium sized KW DC Power Building Bloc (referred to in FIG. 2 as having $P_2$ KW, where $P_2$ can be any power level as required by a user for a given antenna configuration. k. One exception to this, in certain embodiments, is that large $P_3$ KW building block (BB) added to services a predetermined additional subset of RMAs for odd array sizes (e.g., odd number of RMAs)

Advantageously, in certain embodiments, each antenna enclosure 204 is configured in advance, before delivery, to be fully tested, integrated, and calibrated at near-field range (NFR) (including array power cables and cooling hoses, and data and communication cables). This, in an advantageous embodiment, the antenna enclosure 204 is delivered fully integrated and calibrated without need for disassembly/reassembly on site. The on-tower connections for the antenna enclosure 204 are greatly reduced as compared to conventional radar systems, and advantageously, in certain embodiments, are reduced to power cables and coolant interfaces (see FIGS. 24-25 herein).

In certain embodiments, the APDU to array power distribution cables, coolant hoses, data and control cables (Fiber) are integrated into the antenna enclosure 204 at the manufacturer prior to NFR/calibration. In certain embodiment, the data cables are rolled and bundled for shipment/routed to the data processing shelter 212 on site. This saves considerable labor by avoiding multiple steps of install during manufacture, deinstall for delivery, then reinstall at installation site. In certain embodiments, the array enclosure 204 is weather tight/EMI Sealed, HEMP resistant, and couples to the rest of the system via Direct AC Power Cables that connect from below. The antenna enclosure 204, in some embodiments, is environmentally controlled via passive heat/cooling with array dehumidifiers (as well as actively cooled via the cooling shelter 214 mentioned above, which can be implemented using liquid coolants, as is known in the art). The antenna enclosure 204 includes antenna maintenance areas 209 designed to safety & human factors standards. The array enclosure 802 includes built-in lift points and alignment for ease of installation & removal and includes rear Access with secure locks (the primary access door, not visible in FIGS. 8A-8B, is behind the array). The design of the antenna enclosure 802 is configured for facilitating future Scalability, dramatically reducing down time during upgrade.

Figure 10:
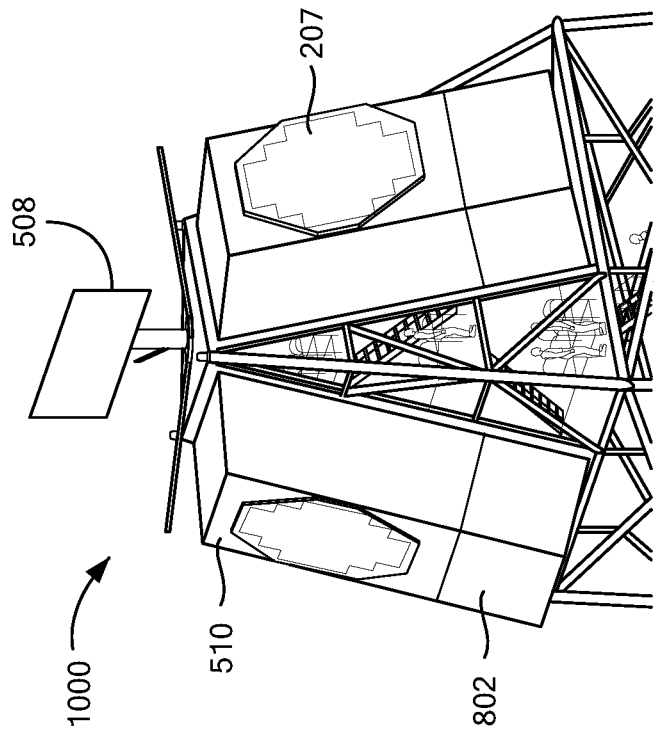
FIG. 10 is an operational view of the self-contained antenna enclosures of FIG. 9.
Figure 9:
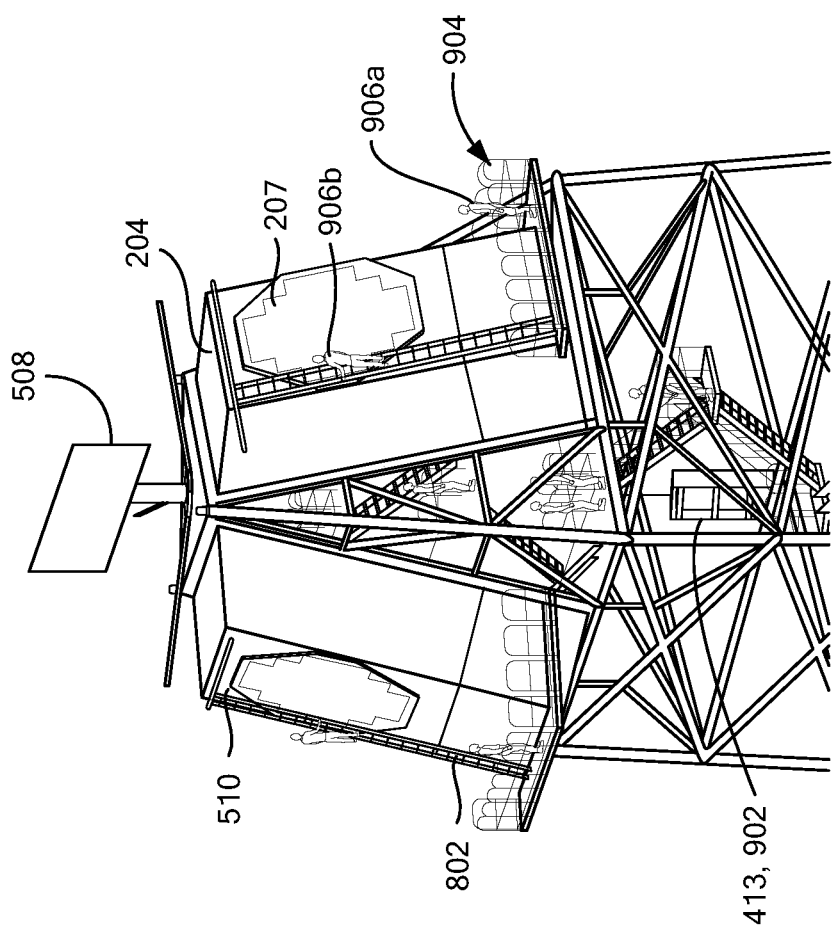
FIG. 9 is a maintenance view of several self-contained antenna enclosures mounted to the top portion of the modular tower of FIG. 5, showing a component in transit, in accordance with one embodiment.

FIG. 9 is a maintenance view 900 of several self-contained antenna enclosures mounted to the top portion of the modular tower of FIG. 5, showing a component 902 in transit using elevator 413, in accordance with one embodiment, and FIG. 10 is an operational view 1000 of the self-contained antenna enclosures of FIG. 9. As FIGS. 9 and 10 show, the radar system can include features such as railings 904a for the safety of a worker 906a performing maintenance, and these railings 904 can be configured and designed so as not to interfere with the radar (e.g., to be removable) during an operational mode, as shown in FIG. 10.

Figure 11:
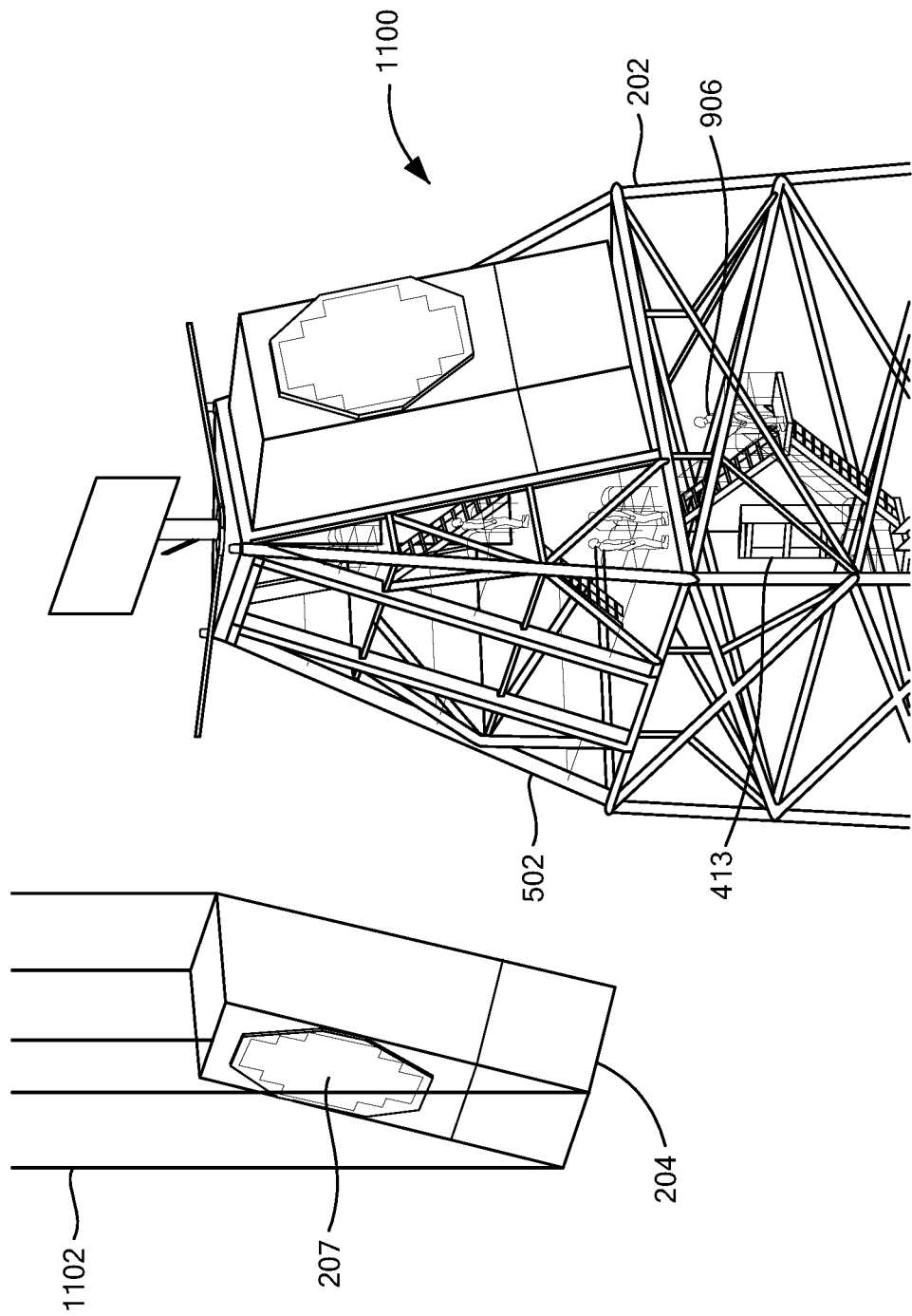
FIG. 11 depicts a view of removing and/or installing an antenna enclosure to the tower of FIG. 5, such as for installation, growth, and/or upgrade, in accordance with one embodiment.

FIG. 11 depicts a view 1100 of removing an antenna enclosure 204, to be replaced with a second enclosure (not shown) for growth and/or upgrade, in accordance with one embodiment. The illustration of FIG. 11 also is applicable to show how the antenna enclosure 204 is first installed to the support structure. In FIG. 11, the entire antenna enclosure 204a is being removed and/or attached via a crane (not shown) and cables 1102 (which are selected to support the weight of the antenna enclosure 204), with the assistance of workers 906 (to help remove the array enclosure 204a from the alignment pins (not shown but see FIG. 6 above). The array enclosure 204 is calibrated to a deployed configuration to meet a deployment objective. When the array enclosure 204 is later replaced with another antenna enclosure having a larger, factory calibrated antenna, additional upgrades to the radar system 200 and/or its other subsystems may be necessary to fully integrate the larger, factory calibrated antenna, such as upgrades to the ground shelter equipment to provide additional capacity (e.g., power and cooling capacity). This is done easily without impacting the rest of the system, and because the interfaces are standard, no other re-engineering or redesign is needed.

Referring to FIGS. 5, 6, and 11, it will be appreciated that the dimensions of the support structure 502 can vary based on the size of the antenna enclosure 204. In certain embodiment, the trapezoid shape of the top portion 502 basically describes the shape of the tapered top (triangular pyramid) as seen looking at one radar face. Although the mounted enclosure in the exemplary embodiments is rectangular, the base of the triangular pyramid shape is much wider than the top. As will be understood, describing the shapes in this way can help characterize the exposure from wind impacting the tower structural calculations. In certain embodiments, the RMAs have a dimension of 2 feet by 2 feet and represent the active area of the array, but the enclosure itself, in certain embodiments, is much larger. In addition, in some embodiments, the array PDUs (which in an exemplary embodiment are over 7 feet in length) are not sitting underneath the antenna in the enclosure. Thus, an added area as shown in the trapezoid face size, can be needed. In some embodiments, the enclosure is the same size regardless of active area. In some embodiments, for array configurations that are smaller than $N_1$ RMAs (for the smaller enclosure) or $N_2$ RMAs (for the larger enclosure), weather sealed covers are used.

Figure 12:
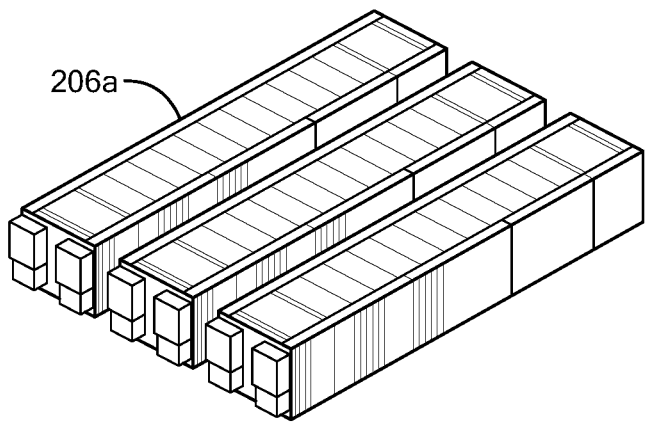
FIG. 12 is an illustration of the direct current (DC) power distribution shelter, in accordance with one embodiment.
Figure 13:
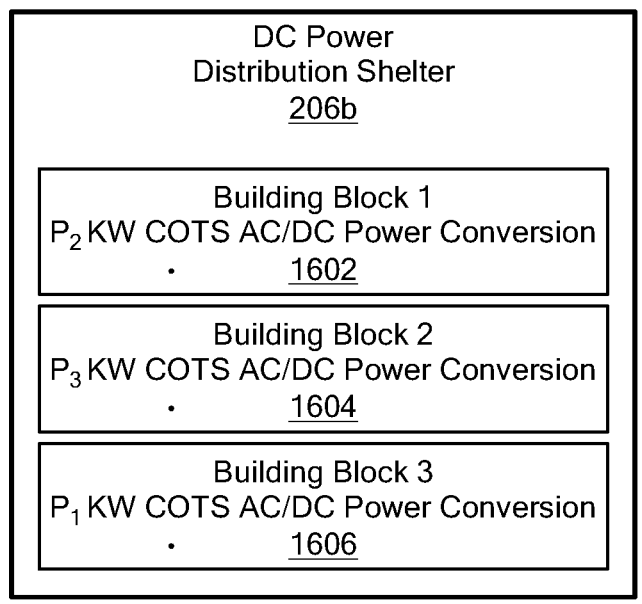
FIG. 13 is a block diagram of the DC power distribution shelter of FIG. 12.
Figure 14:
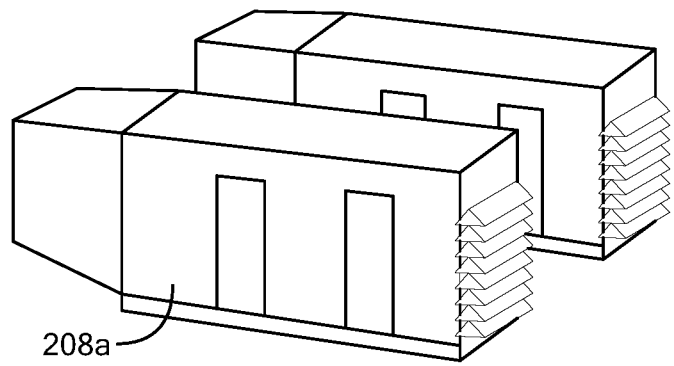
FIG. 14 is an illustration of the alternating current (AC) power shelter, in accordance with one embodiment, in accordance with one embodiment.
Figure 15:
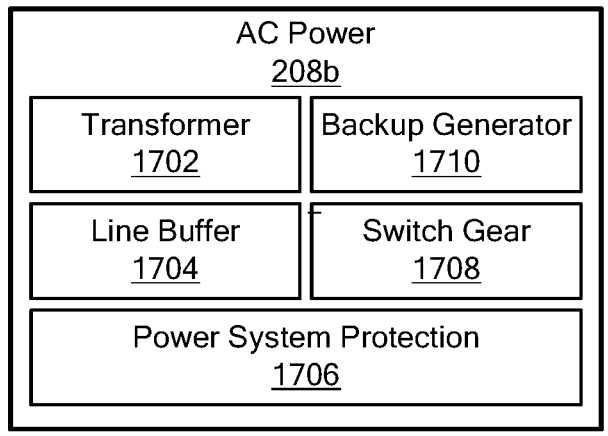
FIG. 15 is a block diagram of the AC power shelter of FIG. 14, in in accordance with one embodiment.

FIGS. 12-13 are an illustration 206a and block diagram 206b, respectively, of the direct current (DC) power distribution shelter, in accordance with one embodiment. As can be seen in FIG. 12, the shelters are comparable to conventional shipping cargo containers, in certain embodiments. In certain embodiments, the DC power distribution shelter 206b comprises three building blocks COTs AC/DC power conversion subsystems, each having differing power capacities. Commercially available power supplies, batteries, etc., as is known in the art, are usable within these shelters. FIGS. 14-15 are an illustration 208a and block diagram 208b, respectively, of the alternating current (AC) power shelter, in accordance with one embodiment. The AC power shelter, in certain embodiments, 208b includes a transformer 1702, line buffer 1704, power system protection 1706, switch gear 1708, and backup generator 1710.

Figure 16:
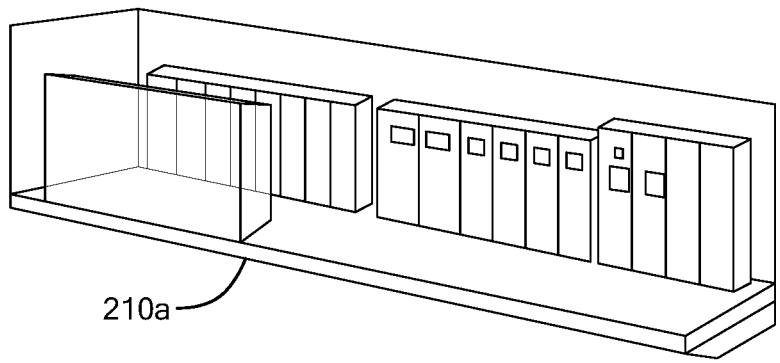
FIG. 16 is an illustration of an uninterruptible power supply (UPS) shelter, in accordance with one embodiment.
Figure 17:
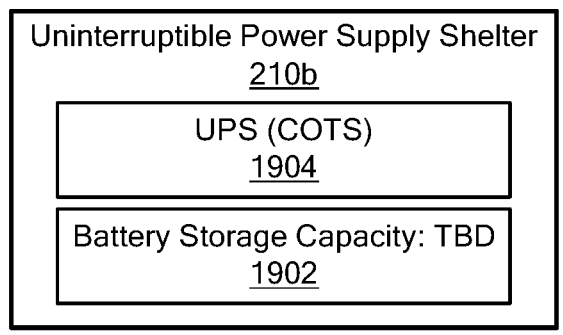
FIG. 17 is a block diagram of the UPS shelter of FIG. 16, in accordance with one embodiment.

FIGS. 16-17 are an illustration 210a and block diagram 210b, respectively, of an uninterruptible power supply (UPS) shelter, in accordance with one embodiment. This component can be implemented with a suitable COTs product, as shown, and advantageously is sized to the size of the antenna. Note that the components shown are illustrative and not limiting.

Figures 18, 19:
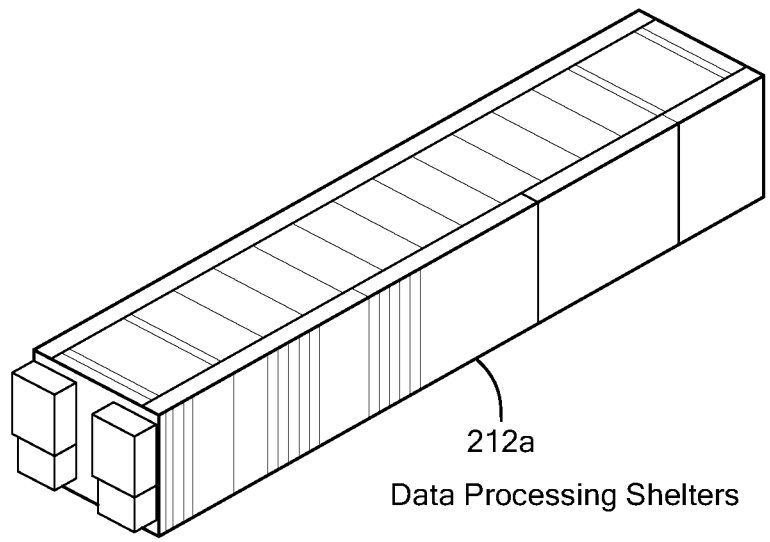
FIG. 18 is an illustration of a data processing shelter, in accordance with one embodiment.
FIG. 19 is a block diagram of the data processing shelter of FIG. 18, in accordance with one embodiment.

FIGS. 18-19 are an illustration 212a and block diagram 212 b, respectively, of a data processing shelter 212, in accordance with one embodiment. The data processing shelter 212 is a system that includes computers and other processors (e.g., similar to FIG. 26 herein) to perform many typical radar system and antenna control and processing functions (e.g., those shown in FIG. 19, which are illustrative and not limiting). Typically, this will be a re-used type of component. In certain embodiments, the data processing shelter 212 includes computers (e.g., similar to that shown in FIG. 26) to provide functions that include scalable beamformer and signal processing functions that are tailored to the size of the antenna arrays (i.e., by providing commands to the antenna array via an interface, controlling beamforming for the antenna array, performing signal processing on signals the antenna array communicates to the data processing shelter, such as I and Q information, etc.). As shown in the interface FIG. 24 herein, in some embodiments, the data processing shelter 212 also can be configured to monitor the health and status of all radar system 200 components. In addition, as shown in the interface of FIG. 24 herein, in certain embodiments, the data processing shelter is in operable communication with a computer network that is in operable communication with a 2505 networked communications subsystem (in certain embodiments, the communications subsystem can correspond to a C5I communications subsystem, where C5I stands for "command, control, computers, communications, cyber-defense (C5), and intelligence."

Figure 20:
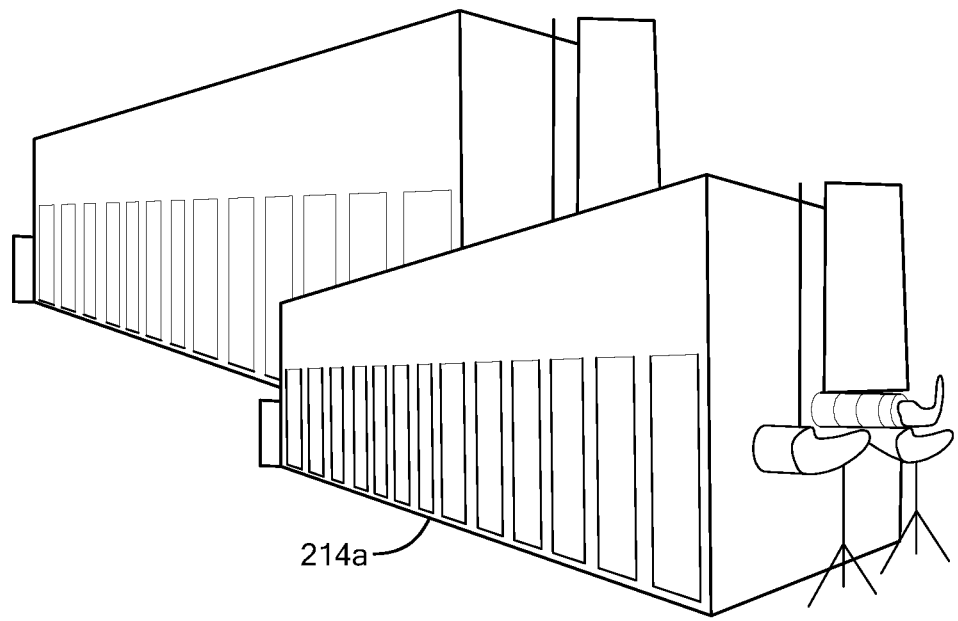
FIG. 20 is an illustration of a cooling equipment shelter (CES), in accordance with one embodiment.
Figure 21:
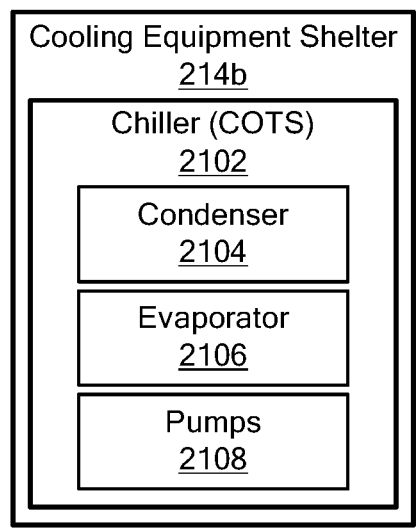
FIG. 21 is a block diagram of the CES of FIG. 20, in accordance with one embodiment.

FIGS. 20-21 are an illustration 214a and block diagram 214b, respectively, of a cooling equipment shelter (CES), in accordance with one embodiment. As is appreciated by those of skill in the art, many cooling systems from many manufacturers are usable, but in certain embodiments, the metallic components used in the cooling system are intended to be compatible metal to what is in the antenna 207. What is important is that the cooling system capacity match the requirements of the antenna. Advantageously, in certain embodiments, the cooling system 214 is scaled so as to be defined by capacity and redundancy. The cooling system, in certain embodiments, uses liquid coolant. In certain embodiments, the pumps 2108 are configured to be able to pump coolant up the length of the tower and likewise to receive returned coolant, as will be understood (see also FIGS. 24-25).

Figure 22:
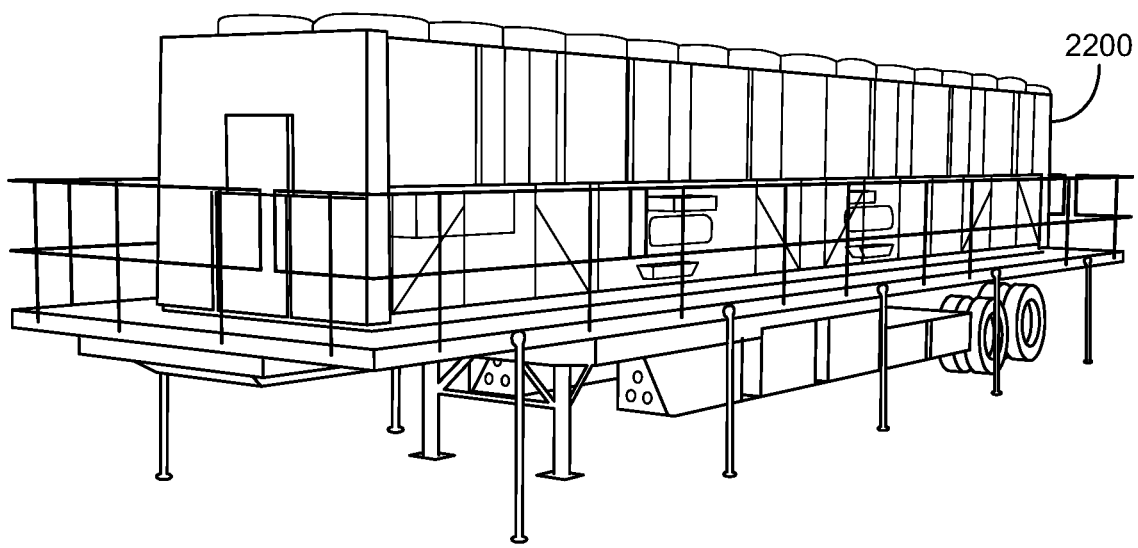
FIG. 22 is an illustrative example of a trailer mounted commercial off the shelf systems (COTS) usable for deployment of at least some embodiments herein.
Figure 23:
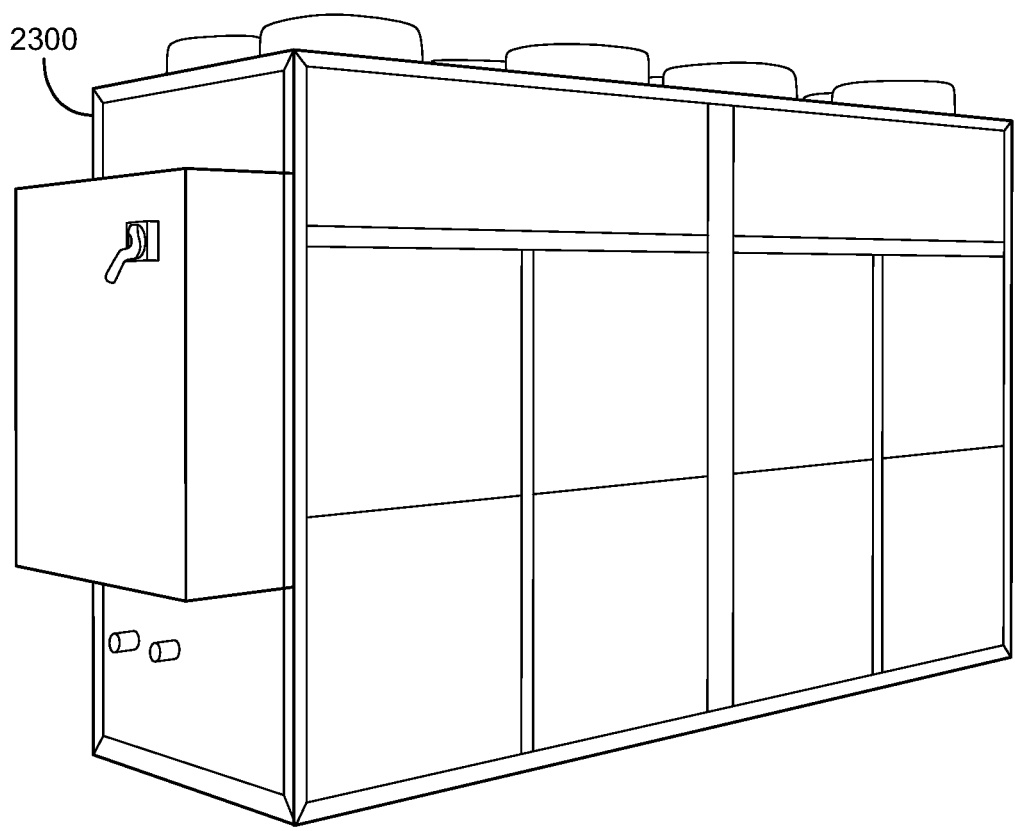
FIG. 23 is an illustrative example of a palletized COTS usable for deployment of at least some embodiments herein.

FIG. 22 is an illustrative example 2200 of a trailer mounted commercial off the shelf systems (COTS) usable for deployment of at least some embodiments herein; FIG. 23 is an illustrative example of a palletized COTS usable for deployment of at least some embodiments herein. Other ways to deploy and move radar building blocks and shelters, including by air and see, are, of course, usable.

FIG. 24 is an illustrative block diagram example 2500 of physical interfaces between radar systems elements of the systems of FIGS. 2 and 3, in an exemplary composable radar system, in accordance with one embodiment. The similarly numbered elements in FIG. 24 correspond to the same elements as described elsewhere herein. In FIG. 25, the array 2502 is, in certain embodiments, a secondary surveillance radar large vertical aperture array (e.g., a transponder based interrogation for an air traffic control (ATC) radar, but this is not limiting. The communications subsystem is, in certain embodiments, separate from the composable radar of other embodiments.

FIG. 24 shows that the DC power conversion shelter 206 supplies DC power 231 to the antenna enclosure 206 and receives AC input 221d from the site AC power distribution shelter 208. The AC power distribution shelter 208 is configured to supply AC power 221 to multiple other subsystems, including antenna AC power 221a to the antenna enclosure subsystem 204, and input AC power 221d to the DC power conversion shelter 206, input AC power 221e to the UPS shelter 210, and input AC power 221c to the cooling equipment shelter 214. In certain embodiments, the AC, DC, and/or UPS power can collectively be referred to as a power subsystem, whether or not any or all of these components are in separate shelters or all within the same shelter;

The UPS shelter 210 provides additional AC input 223a to the antenna enclosure subsystem 204 and provides AC power 223b to the data processing shelter 212.

The cooling equipment shelter 214 cools both the antenna enclosure subsystem 204 (via cooling liquid in 215a and cooling return 215b) and the data processing shelter 212 (via chilled water in 215c returned water 215d.

The data processing shelter 212 sends array commands 227 to the antenna enclosure subsystem 204 and receives I and Q data 229 from the antenna enclosure subsystem 204. In addition, in certain embodiments, the various components of FIG. 25 all communicate respective health and status information to the data processing shelter 2012. In certain embodiment, the data processing shelter 211 sends and receives array commands/communications 233 to the array 2501 and sends and receives GPS signals 235a, 235b to a tower GPA antenna 239 and the array 2502, respectively. The tower GPS antenna 239 is mechanically mounted to the tower 202, in certain embodiments, as is the array 2502.

FIG. 25 is an illustrative block diagram example 2600 of the composable radar system of FIG. 3 as adapted to work in an exemplary surveillance radar system, in accordance with one embodiment. Components in this diagram correspond to similarly numbered components described elsewhere in this document. This block diagram example 2600 is illustrative, and not limiting, to show an example of how the modular and scalable composable radar system of FIGS. 2 and 3 (and elsewhere herein) can look when fielded.

Referring to the exemplary embodiment of FIG. 25, the tower 202 includes one or more enclosures 204, each enclosure including an array 207. The tower includes connections 411 (e.g., communications signal lines, power lines, conduits and/or cabling) enabling various power, data, communications, and cooling connections to be made to the array 207 and/or other components contained within the enclosure 204. FIG. 25, like FIG. 24, details in block diagram format the contents of the connections 411. COTS cooling equipment 214 provides cooling liquid input/cooling return 215 to the S band Array 207, as described also in FIG. 25. The array enclosure 204 includes 9 array power distribution units (APDUs) 802 and a capacitor bank 813, to provide input power signals to the array 207, including DC input 231*b* and AC input 223*a*. These input power signals 231*b*, 223*a*, come from power shelter 208*b* as DC output 231*a* and from UPS shelter 210*b* as AC output 223*a*. The array 207 receives array control signals 227 and sends array status signals, to the data processing shelter 212. In addition, the array 207 provides I & Q data 229 to the data processing shelter 212.

In certain embodiments, the tower 202 includes one or more additional sensors or other antennas, such as the rotating sensor 2502, which communicates with the data processing shelter 212. For example, in one embodiment, the rotating sensor 2502 receives array commands/communications 233 from the data processing shelter 212 and sends RF and/or GPS signals 235*b*, to the data processing shelter 212. Although not explicitly illustrated in FIG. 25, the rotating sensor 2502 is powered via an AC input 221*b* (as shown in FIG. 24), which is provided via the AC power distribution of the site power grid 208.

One or more power shelters 208 provide the DC output 231*a* to the array enclosure 204 and receive an AC input 221*d* from site power grid 208 via transformer 2640, line buffer 2642, and power protection and switch gear 2634. The power shelter 208 of FIG. 25 includes a capacitor bank 2602, an AC/DC converter 2604, and a harmonic neutralizer 2606 (to help prevent ripples in the power line signals).

The UPS shelter 210*b* receives AC input 221*e* from the aforementioned power protection/switch gear 2634 and provides several AC outputs 223*a*, 223*b*, to the array enclosure 204 and data processing shelter 212, respectively. The UPS shelter 210*b*, in this exemplary embodiment, includes three UPS/Power conditioners 2608, a UPS battery 2610, three input filters 2612, and input transformer 2614, and a soft start 2616.

The data processing shelter 212 in this exemplary embodiment can include one or more of the elements shown in the exemplary data processing shelter of FIG. 19. For example, the data processing shelter 212 of FIG. 25 includes one or more antenna interface unit (AIU) subsystems 2012, which are configured to receive the I &Q Data 227 from the array 207 and/or the RF and GPS data 235*b* from the rotating sensor 2502. The data processing shelter 212 also includes a digital beamformer subsystem 2002 (which scales with array size) to communicate digital beamforming information and related array control information/commands 227 to the array 207. Various signal and data processor subsystems, such as those shown in FIG. 19 (e.g., one or more of a real-time simulation subsystem 2006, data recording subsystem (DRSS) 2008), digital signal processor subsystem (DSPS) 2014, radar control processing subsystem (RCP) 2016 and/or risk management framework (RMF) 2018, can be included in the signal and data processors section. In certain embodiments, the data processing shelter 212 also can comprise multiple units of mission storage 2015. In certain embodiments, depending on the other components in the system 2600, the data processing shelter 212 also can include other interfaces, such as a communications interface 2019 to interface to that subsystem, and other subsystems, such as a sensor subsystem 2017 configured to work with the rotating sensor 2502. The data processing shelter 2012 receives power from the UPS shelter via a 208 VAC connection 223*b*. Although not shown in FIG. 25, it will be appreciated that the data processing shelter 212 of FIG. 25 also can include processing to monitor health and status information of various system components, similar to the data processing shelter 212 of FIG. 24.

Referring again to FIG. 25, the system 2600 of this embodiment includes a site power grid 208 that provides site power distribution, including, as an example, three different AC outputs, but this is not, of course, limiting.

As the aforementioned descriptions and figures indicate, at least some of the embodiments described herein help to provide configurable, high TRL radar-level solutions that can help to meet a wide range of multi-mission requirements with minimal, if any, redesign for a variety of mission applications. At least some embodiments herein provide mature radar system options meeting a diverse mission space affordably without requiring substantial new development. At least some embodiments herein help to dramatically reduce both deployment and capability upgrade timelines. At least some embodiments herein fully leverage mature, proven technologies to avoid years of development and testing. One or more embodiments herein help establish system performance through simulation to eliminate expensive system level-test programs. For example, some kinds of conventional radar systems are field tested through expensive and extensive flight test programs to demonstrate system capability, and this often must be done for each new configuration or modification. However, in certain embodiments as described herein, it can be possible to verify performance of one configuration (e.g., an implementation that uses $N_1$ RMAs), via conventional methods, then use the information from that configuration test, to help to simulate a final configuration of other arrangements (e.g., $N_2$ RMAs). Because the components are modular, scalable, and carefully calibrated before installation, the performance of a given configuration or arrangement can be better predicted or simulated, because it is being constructed using known building block components that have already each been performance verified. It will be appreciated that because so many configurations are possible using the building blocks described herein, it can be advantageous to be able to avoid having to do rigorous, extensive, expensive testing with each of the tens of possible configurations. Simulations of the configurations can be relied upon to demonstrate potential performance, because the building blocks are consistent and have known performance. Thus, use of at least some embodiments described herein helps to provide a low cost alternative to extend system capabilities to combat emerging, future targets with minimal down time, using multiple different configurations built from proven and tested building blocks.

It is envisioned that any or all of the embodiments described herein and/or illustrated in FIGS. 1-26 herein could be combined with and/or adapted to work with the technologies described in one or more of the commonly assigned U.S. patent applications and patents, including but not limited to:

- U.S. Pat. No. 9,116,222, entitled, "Modular architecture for scalable phased array radars," issued on Aug. 25, 2015;
- U.S. Pat. No. 8,810,448, entitled, "Modular architecture for scalable phased array radars," issued on Aug. 19, 2014
- U.S. Patent Publication No. 2021008339, entitled, "Modular and Stackable Antenna Array," published on Mar. 18, 2021.

The contents of the above-listed patents and published patent applications are hereby incorporated by reference.

The embodiments described herein advantageously are adaptable for any land-based high powered radar program, especially those that require low cost, high maturity solutions. The embodiments described herein advantageously can be implemented, in certain embodiments, using S-Band Product Line radars, but those of skill in the art will appreciate that the embodiments described herein are readily adaptable to other frequencies (including X-Band, C-Band and L-Band). Further, the embodiments described herein are extensible to other product areas requiring tower-based sensing such as cruise missile defense, Air surveillance including Air Traffic Control (ATC), and critical asset protection.

One additional advantage of at least some embodiments described herein is improved survivability. For example, the building block architecture described for at least some embodiments, enables the use of distributed hardware for survivability. Failure or destruction of any one radar building block component need not result in system failure, but instead a component can be replaced with another modular component performing the same function. In some embodiments, the antenna enclosure, power shelter, processing shelter, and cooling shelter, are easily distributed and function independently. This enables separation for survivability, as noted above. It also enables sharing and movement of radar system and subsystem building blocks, as need. Yet another advantage of at least some embodiments described herein is a resultant significantly lower cost than other available standard ground facilities and missile defense agency (MDA) radar sites.

It can be seen that, using the building blocks described herein, that multiple (e.g., at least 12-24, depending on tower size) high performance, multi-mission radar configurations can be defined via the common radar building blocks shown in FIGS. 2-3 and throughout the application, including but not limited to the tower subsystem 202, the array enclosure sub system 204, the DC power distribution shelter 206, the AC power shelter 208, the UPS shelter 210, the data processing shelter 212, and the cooling equipment shelter 2014. The antenna enclosure subsystem 204 can be implemented with common or different array sizes. Moreover, the antenna enclosure subsystem 204 need not have the illustrative rectangular three dimensional shape shown in the embodiments herein. The antenna enclosure subsystem 204 could, for example, have any other shape. Pre-defined building blocks (e.g., COTs components) and be used for AC/DC Power Conversion in the DC and AC shelters 206, 208, and many different mature components can be adapted, as will be appreciated. The UPS 210 and chiller (cooling) 214 architectures are scalable. The tower 202 subsystem can have a variable height and a scalable antenna. All components, in at least some embodiments, are intended to be pre-tested, pre-calibrated (if applicable) and pre-validated before install.

It should be understood, however, that the disclosed embodiments are not limited to use with the above-listed exemplary Raytheon systems/programs or any other radar systems, target detection systems, and/or antenna-based systems. The embodiments described herein have numerous applications and are not limited to the exemplary applications described herein. It should be appreciated that such references and examples are made in an effort to promote clarity in the description of the concepts disclosed herein. Such references are not intended as, and should not be construed as, limiting the use or application of the concepts, systems, arrangements, and techniques described herein to use solely with these or any other systems.

Figure 26:
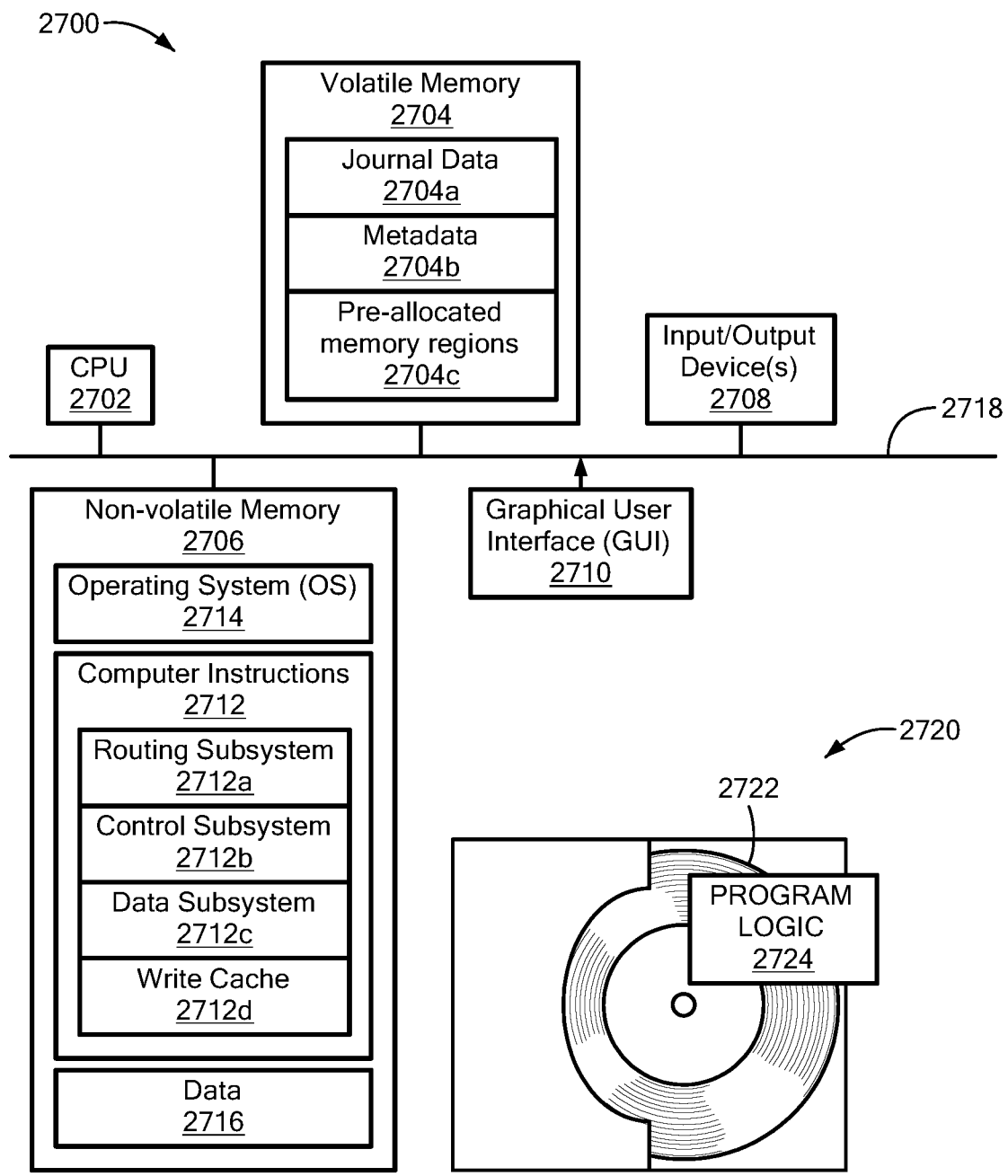
FIG. 26 is a block diagram of an exemplary computer system usable with at least some of the systems and apparatuses of FIGS. 1-26, in accordance with one embodiment.

FIG. 26 is a block diagram of an exemplary computer system usable with at least some of the systems and methods of FIGS. 1-25, in accordance with one embodiment. In some embodiments, the computer system 2700 of FIG. 26 can be usable as the computer(s) used in the data processing shelter. Reference is made briefly to FIG. 26, which shows a block diagram of a computer system 2700 usable with at least some embodiments. The computer system 50 also can be used to implement all or part of any of the methods, equations, and/or calculations described herein.

As shown in FIG. 26, computer 2700 may include processor/CPU 2702, volatile memory 2704 (e.g., RAM), non-volatile memory 2706 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 2710 (e.g., a touchscreen, a display, and so forth) and input and/or output (I/O) device 2708 (e.g., a mouse, a keyboard, etc.). Non-volatile memory 2704 stores, e.g., journal data 2704a, metadata 2704b, and pre-allocated memory regions 2704c. The non-volatile memory, 2706 can include, in some embodiments, an operating system 2714, and computer instructions 2712, and data 2716. In certain embodiments, the computer instructions 2712 are configured to provide several subsystems, including a routing subsystem 2712A, a control subsystem 2712b, a data subsystem 2712c, and a write cache 2712d. In certain embodiments, the computer instructions 2712 are executed by the processor/CPU 2702 out of volatile memory 2704 to implement and/or perform at least a portion of the systems and processes shown in FIGS. 1-25. Program code also may be applied to data entered using an input device or GUI 2710 or received from I/O device 2708.

The systems, architectures, and processes of FIGS. 1-26 are not limited to use with the hardware and software described and illustrated herein and may find applicability in any computing or processing environment and with any type of machine or set of machines that may be capable of running a computer program and/or of implementing a radar system (including, in some embodiments, software defined radar). The processes described herein may be implemented in hardware, software, or a combination of the two. The logic for carrying out the methods discussed herein may be embodied as part of the system described in FIG. 26. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor 2702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 26, the machine becomes an apparatus for practicing one or more of the described embodiments. When implemented on one or more general-purpose processors, the program code combines with such a processor to provide a unique apparatus that operates analogously to specific logic circuits. As such a general-purpose digital machine can be transformed into a special purpose digital machine. FIG. 26 shows Program Logic 2724 embodied on a computer-readable medium 2720 as shown, and wherein the Logic is encoded in computer-executable code configured for carrying out the reservation service process of this invention and thereby forming a Computer Program Product 2722. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiments, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Throughout the present disclosure, absent a clear indication to the contrary from the context, it should be understood individual elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, and/or or a data signal. Within the drawings, like or related elements have like or related alpha, numeric or alphanumeric designators (e.g., a component labeled as "204" in FIG. 2 may be similar to a component labeled "404" in FIG. 4, etc.). Further, while the disclosed embodiments have been discussed in the context of implementations using discrete components, including some components that include one or more integrated circuit chips), the functions of any component or circuit may alternatively be implemented using one or more appropriately programmed processors, depending upon the signal frequencies or data rates to be processed and/or the functions being accomplished.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the invention must comprise more than one of that element, nor is it intended by illustrating a single element that the invention is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments. Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety.

What is claimed is:

1. A modular radar system, comprising:
   a plurality of first antenna assemblies, the plurality of first antenna assemblies each comprising (i) a first antenna array, (ii) a first antenna enclosure to which the first antenna array is attached, the first antenna enclosure configured to house the first antenna array and to distribute first communications signals and first power signals to the first antenna array, and (iii) a first antenna enclosure interface configured to receive first inputs to the first antenna array and provide first outputs from the first antenna array;
   a modular ground support to which the plurality of first antenna assemblies are mounted, the modular ground support configured to position the first antenna array of the first antenna enclosure at a first orientation and at an elevation above ground sufficient for antenna operation, wherein the modular ground support comprises:
   a plurality of first modules configured to be stacked one on top of another, each first module configured to provide an increased elevation above the ground, wherein a selected number of two or more of the first modules provides the elevation above the ground sufficient for the antenna operation; and
   a top module located on top of the selected number of first modules and configured to have a plurality of angled sides to position the first antenna array at the first orientation sufficient for the antenna operation; and
   a first set of modular radar subsystems configured to be separate from the modular ground support, the first set of modular radar subsystems configured to be in operable communication with the first antenna enclosure interface via a respective first set of connections, wherein the first set of modular radar subsystems comprises:
   a first data processing subsystem configured to provide the first inputs to the first antenna enclosure interface, to control beamforming for the first antenna array, and to perform signal processing on the first outputs of the first antenna array;
   a first cooling subsystem configured to supply cooling to the first antenna enclosure and the first data processing subsystem; and
   a first alternating current (AC) power subsystem configured to supply power to the first antenna enclosure, the first data processing subsystem, the first cooling subsystem and a first direct current (DC) power conversion subsystem;
   wherein the first antenna array has a first array size, and wherein at least one respective subsystem in the first set of modular radar subsystems is configured to be functionally and independently scalable based on at least one of the first array size and on operational requirements of the first antenna array; and
   wherein the first array size is associated with a first radar aperture size within a scalable range of radar aperture sizes supported by the plurality of first antenna assemblies.

2. The modular radar system of claim 1, wherein the modular ground support is configured to route the respective first set of connections between the first set of modular radar subsystems and the first antenna enclosure interface.

3. The modular radar system of claim 1, wherein the first antenna enclosure and the modular ground support are configured to be scalable to enable the first antenna array to be scaled to a second array size different than the first array size, without removal of the plurality of first antenna assemblies from the modular ground support.

4. The modular radar system of claim 1, wherein the first set of modular radar subsystems are configured to be housed in respective relocatable shelters that are separate from the modular ground support.

5. The modular radar system of claim 1, wherein the first antenna enclosure and the modular ground support are configured to enable self-alignment of the plurality of first antenna assemblies as part of installation of the first antenna enclosure to the modular ground support.

6. The modular radar system of claim 1, wherein;
   the first set of connections further comprises a first portion operably coupled to the first antenna enclosure interface and a second portion configured for connection to a respective one of the first set of modular radar subsystems;

the first set of respective connections and the first antenna enclosure are operably coupled together, including connection of each respective first portion to the first antenna enclosure interface, before installing on the modular ground support; and the first antenna enclosure, first antenna array, and first set of connections are all calibrated prior the plurality of first antenna assemblies being mounted to the modular ground support.

7. The modular radar system of claim 1, wherein the modular ground support comprises an antenna enclosure mounting portion configured to enable attachment of at least a second antenna assembly thereon at a second orientation different from the first orientation, the second antenna assembly comprising:

a second antenna array;

a second antenna enclosure to which the second antenna array is attached, the second antenna enclosure configured to house the second antenna array and to distribute second communications signals and second power signals to the second antenna array; and a second antenna enclosure interface configured to receive second inputs to the second antenna array and provide second outputs from the second antenna array; and wherein the second antenna assembly is in operable communication with a respective second set of modular radar subsystems via a respective second set of connections between the second set of modular radar subsystems and the second antenna enclosure interface, wherein the second set of modular radar subsystems is configured to be separate from the modular ground support and separate from the first set of modular radar subsystems.

8. The modular radar system of claim 7, wherein the second set of modular radar subsystems comprises:

a second data processing subsystem configured to provide the second inputs to the second antenna enclosure interface, to control beamforming for the second antenna array, and to perform signal processing on the second outputs of the second antenna array;

a second cooling subsystem configured to supply cooling to the second antenna enclosure and the second data processing subsystem; and a second alternating current (AC) power subsystem configured to supply power to the second antenna enclosure, the second data processing subsystem, the second cooling subsystem and a second direct current (DC) power conversion shelter; and wherein the second antenna array has a second array size, and wherein at least one respective subsystem in the second set of modular radar subsystems is configured to be functionally and independently scalable based on at least one of the second array size and operational requirements of the second antenna array.

9. The modular radar system of claim 1, wherein the first antenna enclosure is configured to be at least one of watertight, weathertight, electromagnetic interference (EMI) shielded, and high intensity electromagnetic pulses (HEMP) resistant.

10. The modular radar system of claim 1, wherein the modular ground support comprises a tower structure configured to elevate the plurality of first antenna assemblies by a predetermined distance above the first set of modular radar subsystems.

11. The modular radar system of claim 1, wherein the modular ground support is not entirely enclosed by walls.

12. The modular radar system of claim 1, further comprising:

one or more rotating sensors mounted to the modular ground support above the first antenna array, the one or more rotating sensors configured to cover a sensing area overlapping at least part of a sensing area covered by the first antenna array.

13. A modular radar system, comprising:

an antenna assembly mountable at an orientation and at an elevation above ground sufficient for antenna operation, the antenna assembly comprising (i) an antenna array, (ii) an antenna enclosure to which the antenna array is attached, the antenna enclosure configured to house the antenna array and to distribute communications signals and power signals to the antenna array, and (iii) an antenna enclosure interface configured to receive inputs to the antenna array and provide outputs from the antenna array;

a modular ground support to which the antenna assembly is mounted, the modular ground support configured to position the antenna array of the antenna enclosure at a first orientation and at an elevation above the ground sufficient for the antenna operation, wherein the modular ground support comprises:

a plurality of first modules configured to be stacked one on top of another, each first module configured to provide an increased elevation above the ground, wherein a selected number of two or more of the first modules provides the elevation above the ground sufficient for the antenna operation; and a top module located on top of the selected number of first modules and configured to have a plurality of angled sides to position the antenna array at the first orientation sufficient for the antenna operation; and a set of modular radar subsystems that is configured to be separate from the antenna assembly, the set of modular radar subsystems configured to be in operable communication with the antenna enclosure interface via a respective set of connections, wherein the set of modular radar subsystems comprises:

a data processing subsystem configured to provide the inputs to the antenna enclosure interface, to control beamforming for the antenna array, and to perform signal processing on the outputs of the antenna array;

a cooling subsystem configured to supply cooling to the antenna enclosure and the data processing subsystem; and an alternating current (AC) power subsystem configured to supply power to the antenna enclosure, the data processing subsystem, the cooling subsystem and a direct current (DC) power conversion subsystem;

wherein the antenna array has an array size, and wherein at least one respective subsystem in the set of modular radar subsystems is configured to be functionally and independently scalable based on at least one of the array size and operational requirements of the antenna array; and wherein the array size is associated with a radar aperture size within a scalable range of radar aperture sizes supported by the antenna assembly.

14. The modular radar system of claim 13, wherein:

the set of connections further comprises a first portion operably coupled to the antenna enclosure interface and a second portion configured for connection to a respective one of the set of modular radar subsystems;

the set of respective connections and the antenna enclosure are operably coupled together, including connection of each respective first portion to the antenna enclosure interface, before installation at an operational location; and the antenna enclosure, antenna array, and set of connections are all calibrated prior the antenna assembly being installed at the operational location.

15. The modular radar system of claim 13, wherein:

the set of connections is routed through the modular ground support; and the modular ground support comprises a tower structure that is separate from the set of modular radar subsystems and is configured to elevate the antenna assembly a predetermined distance above the set of modular radar subsystems.

16. The modular radar system of claim 15, wherein the top module is configured to permit mounting of the antenna enclosure at any one of a plurality of orientations.

17. The modular radar system of claim 13, wherein the antenna enclosure is configured to be at least one of watertight, weathertight, electromagnetic interference (EMI) shielded, and high intensity electromagnetic pulses (HEMP) resistant.

18. The modular radar system of claim 13, wherein the modular ground support is not entirely enclosed by walls.

19. A method of providing a modular radar system, the method comprising:

attaching an antenna array to an antenna enclosure, wherein the antenna enclosure is configured to house the antenna array and to distribute communications signals and power signals to the antenna array;

coupling to the antenna enclosure an antenna enclosure interface configured to receive inputs to the antenna array and provide outputs from the antenna array;

attaching a set of connections to the antenna enclosure interface to form an antenna assembly comprising the antenna enclosure, the antenna array, the antenna enclosure interface, and the set of connections, wherein the set of connections are configured to couple the antenna assembly to one or more modular radar subsystems;

stacking a selected number of two or more of a plurality of first modules of a modular ground support and a top module having a plurality of angled sides on top of the selected number of first modules, each first module providing an increased elevation above the ground;

mounting the antenna assembly to the modular ground support to position the antenna array at an orientation and at an elevation above the ground sufficient for antenna operation, the selected number of first modules providing the elevation above the ground sufficient for the antenna operation, the top module positioning the antenna array at the orientation sufficient for the antenna operation;

operably connecting a data processing subsystem to one or more corresponding data processing connections in the set of connections, the data processing subsystem being separate from the modular ground support and being configured to provide the inputs to the antenna enclosure interface, to control beamforming for the antenna array, and to perform signal processing on the outputs of the antenna array;

attaching a cooling subsystem to one or more corresponding cooling connections in the set of connections, the cooling subsystem being separate from the modular ground support and being configured for supplying cooling to the antenna enclosure and to the data processing subsystem;

operably connecting an alternating current (AC) power subsystem to one or more corresponding power connections in the set of connections, the AC power subsystem being separate from the modular ground support and being configured for supplying power to the antenna enclosure, the data processing subsystem, the cooling subsystem, and a direct current (DC) power conversion subsystem; and configuring at least one of the data processing subsystem, the cooling subsystem, and the AC power subsystem to be functionally and independently scalable based on at least one of a size of the antenna array and on operational requirements of the antenna array;

wherein the size of the antenna array is associated with a radar aperture size within a scalable range of radar aperture sizes supported by the antenna assembly.

20. The method of claim 19, wherein the modular ground support is not entirely enclosed by walls.

21. The method of claim 19, further comprising calibrating the antenna assembly before mounting the antenna assembly to the modular ground support.

* * * * *